(12) United States Patent
Ma et al.

(10) Patent No.: US 12,720,532 B2
(45) Date of Patent: Aug. 25, 2026

(54) SYSTEMS AND TECHNIQUES FOR UPLINK TRANSMISSION TIMING WITH SCHEDULING OFFSETS

(71) Applicant: QUALCOMM Incorporated, San Diego, CA (US)

(72) Inventors: Liangping Ma, San Diego, CA (US); Alberto Rico Alvarino, San Diego, CA (US); Xiao Feng Wang, San Diego, CA (US); Peter Gaal, San Diego, CA (US); Jae Ho Ryu, San Diego, CA (US); Wanshi Chen, San Diego, CA (US); Lianghai Ji, San Diego, CA (US); Juan Montojo, San Diego, CA (US); Changhwan Park, San Diego, CA (US); Bharat Shrestha, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 520 days.

(21) Appl. No.: 18/306,133

(22) Filed: Apr. 24, 2023

(65) Prior Publication Data

US 2023/0345474 A1 Oct. 26, 2023

Related U.S. Application Data

(60) Provisional application No. 63/334,599, filed on Apr. 25, 2022.

(51) Int. Cl.
*H04W 72/1268* (2023.01)
*H04W 72/232* (2023.01)

(52) U.S. Cl.
CPC ..... *H04W 72/1268* (2013.01); *H04W 72/232* (2023.01)

(58) Field of Classification Search
CPC ... H04L 1/0003; H04L 1/0009; H04L 1/1812; H04L 1/1822; H04L 1/1854; H04L 1/189;
(Continued)

(56) References Cited

U.S. PATENT DOCUMENTS

| | | | | |
|---|---|---|---|---|
| 10,986,657 B2 * | 4/2021 | Nam | ..................... | H04L 5/0053 |
| 11,115,998 B2 * | 9/2021 | Nam | ................. | H04W 72/0446 |

(Continued)

FOREIGN PATENT DOCUMENTS

| | | | | |
|---|---|---|---|---|
| CN | 112514486 B * | 7/2024 | ........... | H04L 5/0053 |
| EP | 4099602 A1 * | 12/2022 | ........... | H04L 5/0053 |

(Continued)

OTHER PUBLICATIONS

Ericsson: "Feature Lead Summary on Timing Relationship Enhancements", 3GPP TSG-RAN WG1 Meeting #102-e, R1-200xxxx, e-Meeting, Aug. 17-28, 2020, Jan. 1, 2020, 64 Pages, XP055743390, The whole document.

(Continued)

*Primary Examiner* — Eric Nowlin
(74) *Attorney, Agent, or Firm* — Polsinelli LLP

(57) ABSTRACT

Systems and techniques are provided for wireless communications. For example, an apparatus (e.g., a user equipment (UE)) may receive a downlink transmission in a first downlink time slot and receiving an update to a scheduling offset associated with a propagation time delay of communications between the apparatus and a network entity. The update indicates an updated scheduling offset. The apparatus may determine a selected scheduling offset as one of the scheduling offset or the updated scheduling offset. The apparatus may transmit, using a second uplink time slot, an uplink transmission associated with the downlink transmission. The second uplink time slot may be determined based on a first uplink time slot and the selected scheduling offset.

27 Claims, 14 Drawing Sheets

(58) Field of Classification Search
CPC ........ H04L 1/1896; H04L 5/00; H04W 72/12; H04W 72/23
See application file for complete search history.

(56) References Cited

U.S. PATENT DOCUMENTS

| | | | | |
|---|---|---|---|---|
| 11,895,058 | B2 * | 2/2024 | Raghavan | H04L 5/001 |
| 12,245,242 | B2 * | 3/2025 | Hakola | H04L 5/0094 |
| 12,273,880 | B2 * | 4/2025 | Shubhi | H04L 5/0048 |
| 12,328,700 | B2 * | 6/2025 | Dai | H04W 56/00 |
| 12,425,980 | B2 * | 9/2025 | Ma | H04L 5/0053 |
| 2020/0037348 | A1 * | 1/2020 | Nam | H04W 72/20 |
| 2020/0196340 | A1 * | 6/2020 | Nam | H04W 72/0446 |
| 2021/0051660 | A1 * | 2/2021 | Askar | H04L 5/14 |
| 2021/0336736 | A1 * | 10/2021 | Horn | H04L 27/2613 |
| 2022/0232611 | A1 * | 7/2022 | Hakola | H04L 5/0094 |
| 2022/0369354 | A1 * | 11/2022 | Seo | H04L 5/0094 |
| 2022/0408389 | A1 * | 12/2022 | Wang | H04L 5/0053 |
| 2023/0104008 | A1 * | 4/2023 | Ma | H04B 7/18513 370/329 |
| 2023/0247675 | A1 * | 8/2023 | Shen | H04W 74/0838 370/329 |
| 2023/0254794 | A1 * | 8/2023 | Park | H04W 74/0838 370/316 |
| 2023/0345474 | A1 * | 10/2023 | Ma | H04L 5/0092 |
| 2023/0362833 | A1 * | 11/2023 | Ma | H04W 52/146 |
| 2023/0397247 | A1 * | 12/2023 | Jung | H04B 7/18519 |
| 2024/0049238 | A1 * | 2/2024 | Abotabl | H04L 5/0053 |
| 2024/0056171 | A1 * | 2/2024 | Shariatmadari | H04B 7/18513 |
| 2024/0057002 | A1 * | 2/2024 | Sun | H04W 72/232 |
| 2024/0073927 | A1 * | 2/2024 | Chen | H04L 5/0053 |
| 2024/0195560 | A1 * | 6/2024 | Rupasinghe | H04L 5/0091 |
| 2024/0313855 | A1 * | 9/2024 | Yao | H04B 7/18519 |
| 2024/0349216 | A1 * | 10/2024 | Wang | H04B 7/18513 |
| 2024/0413898 | A1 * | 12/2024 | Cui | H04B 7/18513 |
| 2025/0024508 | A1 * | 1/2025 | Xu | H04W 74/004 |
| 2025/0089098 | A1 * | 3/2025 | Wen | H04W 72/115 |
| 2025/0280418 | A1 * | 9/2025 | Seo | H04L 5/0094 |

FOREIGN PATENT DOCUMENTS

| | | | | |
|---|---|---|---|---|
| EP | 3827625 B1 * | 5/2023 | H04L 5/0053 |
| EP | 4016871 A1 * | 8/2023 | H04W 52/46 |
| EP | 4236171 A2 * | 8/2023 | H04L 5/0053 |
| WO | WO-2020023817 A1 * | 1/2020 | H04L 5/0053 |
| WO | WO-2020225100 A1 * | 11/2020 | H04W 72/23 |
| WO | WO-2021067586 A1 * | 4/2021 | H04W 72/23 |
| WO | WO-2021089858 A1 * | 5/2021 | H04W 24/08 |
| WO | WO-2021164579 A1 * | 8/2021 | H04L 5/0053 |
| WO | 2022073218 A1 | 4/2022 | |
| WO | WO-2023014061 A1 * | 2/2023 | H04B 7/18513 |

OTHER PUBLICATIONS

International Search Report and Written Opinion—PCT/US2023/066178—ISA/EPO—Aug. 9, 2023.

Moderator (Ericsson) : "Feature Lead Summary#1 on Timing Relationship Enhancements", 3GPP TSG-RAN WG1 Meeting #105-e, R1-2105974, 3rd Generation Partnership Project (3GPP), Mobile Competence Centre, 650, Route Des Lucioles, F-06921, Sophia-Antipolis Cedex, France vol. RAN WG1, No. e-Meeting, May 10, 2021-May 27, 2021, May 19, 2021, 40 Pages, XP052012434, p. 5, Issue#3: K_offset usage.

Moderator (Ericsson) : "Feature Lead Summary#4 on Timing Relationship Enhancements", 3GPP TSG-RAN WG1 Meeting #104-e, R1-2102078, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Feb. 4, 2021, 89 Pages, XP051976078, paragraph [06.3].

* cited by examiner

500
UE 505
520
RAN
512
NTN Device
502
522
NTN Gateway
504
Base Station
506
524
Core Network
510

525
UE 505
520
NTN Device/
Base Station
502
RAN 512
522
NTN Gateway
504
524
Core Network
510

550
UE 505
520
RAN
512
NTN-DU
514
522
NTN Gateway
504
NTN-CU
516
524
Core Network
510

1100
1
2
3
4
5
6
7
8
9
10
11
12
13
14
15
16
17
18
1120
$K_1=4$ $K_1=3$ $K_1=2$ $K_1=1$
MAC CE activation time
$K_{offset\_1}=4 \rightarrow K_{offset\_2}=6$
$K_{offset\_1}$
Actual Slot (PUCCH/PUSCH)

1200
1
2
3
4
5
6
7
8
9
10
11
12
13
14
15
16
17
18
1220
$K_1=4$ $K_1=3$ $K_1=2$ $K_1=1$
MAC CE activation time
$K_{offset\_1}=4 \rightarrow K_{offset\_2}=6$
$K_{offset\_2}$
Virtual slot
Actual Slot (PUCCH/PUSCH)

SYSTEMS AND TECHNIQUES FOR UPLINK TRANSMISSION TIMING WITH SCHEDULING OFFSETS

CROSS-REFERENCE TO RELATED APPLICATIONS

This application claims the benefit of U.S. Provisional Application No. 63/334,599, filed Apr. 25, 2022, which is hereby incorporated by reference, in its entirety and for all purposes.

FIELD

Aspects of the present disclosure generally relate to wireless communication. In some implementations, examples are described for performing uplink transmission timing based on receiving one or more scheduling (e.g., $K_{offset}$) updates.

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. In some cases, wireless communications may be exchanged between a user equipment (UE) and a Non-Terrestrial Network (NTN) node or entity, such as a gateway, a base station or portion thereof (e.g., a central unit (CU), a distributed unit (DU), a radio unit (RU), a Near-Real Time (Near-RT) RAN Intelligent Controller (RIC), or a Non-Real Time (Non-RT) RIC, or other NTN node/entity), or one or more satellites or other high-altitude platforms. The relatively large distance between the UE and the NTN node can lead to the wireless communications between the devices to experience large propagation time delays (also referred to as round trip delay (RTD) and/or a round trip time (RTT)).

In some examples, a UE can transmit wireless communication signals to an NTN node using one or more timing offsets to compensate for such propagation time delays. For example, a timing offset, referred to as a scheduling offset (e.g., which can be denoted as $K_{offset}$) can be used in establishing the timing relationship (e.g., uplink and/or downlink) between a UE and an NTN node. For example, a $K_{offset}$ value can be determined based on the RTD or RTT between a UE and an NTN node. A UE may also use a $K_1$ offset as a network timing offset to align a scheduled wireless communication transmission with a desired (e.g., different than otherwise scheduled) uplink time slot of the UE. In some examples, a UE may generate wireless communications in multiple different uplink time slots, and each wireless communication can be associated with a different $K_1$ value that causes the UE to transmit all of the wireless communications in the same future uplink time slot. When a UE transmits wireless communications to a gateway or base station (e.g., gNB or portion thereof, such as a CU, DU, RU, Near-RT RIC, Non-RT RIC, etc.) that is an NTN node, the RTT or RTD for the transmission to travel between the UE and the NTN node may be outside of (e.g., exceed) the maximum range of timing offset values that can be set for a networking timing offset (e.g., $K_1$).

A UE can use $K_{offset}$ as a scheduling offset that is added to each of the network timing offsets $K_1$ determined for the UE's uplink transmissions. For example, when a UE is scheduled to transmit multiple wireless communications (e.g., at different uplink time slots), the different uplink time slots can be associated with different $K_1$ values but use the same $K_{offset}$ value. Additionally, or alternatively, a UE can use the scheduling offset $K_{offset}$ to further shift (e.g., offset) each of its scheduled uplink transmissions by an amount that compensates for or otherwise accommodates the propagation time delay between the UE and the NTN node.

In some cases, a UE may receive a $K_{offset}$ update command while feedback (e.g., one or more acknowledgments (ACK)/negative acknowledgments (NACK)) remain in a queue for uplink transmission. For instance, the UE may have previously received one or more downlink transmissions for which the UE has not yet transmitted feedback, such as an ACK/NACK corresponding to a downlink data transmission (e.g., according to a hybrid automatic repeat request (HARD) process in response to a physical downlink shared channel (PDSCH) transmission). A conflict or ambiguity may occur as to whether the UE will use the old $K_{offset}$ value to transmit the feedback (e.g., the $K_{offset}$ value immediately prior to the UE receiving the $K_{offset}$ update command/the $K_{offset}$ at the time the UE received the downlink transmission for which the feedback was generated) or whether the UE will use the new, updated $K_{offset}$ value. There is a need for systems and techniques that can be used to perform uplink scheduling or transmissions (e.g., uplink ACK/NACK transmissions, and/or other types of uplink transmissions, Channel State Information (CSI) report transmissions, Sounding Reference Signal (SRS) transmissions, etc.) when updates to a scheduling offset (e.g., $K_{offset}$) are received.

Systems and techniques are described herein for uplink (UL) transmission timing in response to scheduling offset updates. For example, the systems and techniques may determine a scheduling offset (e.g., $K_{offset}$) value to use for one or more uplink transmissions (e.g., an ACK/NACK, a CSI report, an SRS, etc.) that are generated in response to receiving a downlink transmission (e.g., a PDSCH transmission, a CSI request, SRS configuration transmission, etc.). The systems and techniques can be used to determine a selected $K_{offset}$ value when a $K_{offset}$ update is received or activated after receiving a downlink transmission but before the scheduled transmission time of a responsive uplink transmission (e.g., before the scheduled transmission time of an uplink transmission acknowledging the downlink transmission).

In some aspects, the systems and techniques can determine or select a scheduling offset as a scheduling offset or an updated scheduling offset based on various factors. The systems and techniques can transmit an uplink transmission (e.g., an ACK/NACK, a CSI report, an SRS, etc.) using a second uplink time slot determined based on the selected scheduling offset. For instance, systems and techniques can determine that a scheduling offset update (e.g., $K_{offset}$ update) has an activation time that occurs between an uplink time slot corresponding to the downlink time slot in which a downlink transmission was received at a UE, and a scheduled uplink transmission time slot calculated by the UE using an old $K_{offset}$ value (e.g., $K_{offset1}$). In some examples, the old $K_{offset1}$ value may always be used when a UE receives a $K_{offset}$ update that activates prior to a scheduled uplink transmission. In some examples, an updated $K_{offset2}$ value may always be used when a UE receives a $K_{offset}$ update that activates prior to a scheduled uplink transmission. In some aspects, a selected $K_{offset}$ value can be determined between the old $K_{offset1}$ and the updated $K_{offset2}$ values based on determining which $K_{offset}$ was active at an uplink time slot calculated using the uplink time slot in which the DL transmission was received (e.g., an uplink time slot N1') and a network timing offset associated with the DL transmission (e.g., $K_1$).

According to at least one example, a method is provided for wireless communications. The method may include: receiving a downlink transmission in a first downlink time slot; receiving an update to a scheduling offset associated with a propagation time delay of communications between the UE and a network entity, wherein the update indicates an updated scheduling offset; determining a selected scheduling offset as one of the scheduling offset or the updated scheduling offset; and transmitting, using a second uplink time slot, an uplink transmission associated with the downlink transmission, wherein the second uplink time slot is determined based on a first uplink time slot and the selected scheduling offset.

In another example, an apparatus for wireless communications is provided that includes at least one memory and at least one processor coupled to the at least one memory. The at least one processor is configured to: receive a downlink transmission in a first downlink time slot; receive an update to a scheduling offset associated with a propagation time delay of communications between the apparatus and a network entity, wherein the update indicates an updated scheduling offset; determine a selected scheduling offset as one of the scheduling offset or the updated scheduling offset; and transmit, using a second uplink time slot, an uplink transmission associated with the downlink transmission, wherein the second uplink time slot is determined based on a first uplink time slot and the selected scheduling offset.

In another example, a non-transitory computer-readable medium of an apparatus is provided that has stored thereon instructions that, when executed by one or more processors, cause the one or more processors to: receive a downlink transmission in a first downlink time slot; receive an update to a scheduling offset associated with a propagation time delay of communications between the apparatus and a network entity, wherein the update indicates an updated scheduling offset; determine a selected scheduling offset as one of the scheduling offset or the updated scheduling offset; and transmit, using a second uplink time slot, an uplink transmission associated with the downlink transmission, wherein the second uplink time slot is determined based on a first uplink time slot and the selected scheduling offset.

In another example, an apparatus for wireless communications is provided. The apparatus includes: means for receiving a downlink transmission in a first downlink time slot; means for receiving an update to a scheduling offset associated with a propagation time delay of communications between the apparatus and a network entity, wherein the update indicates an updated scheduling offset; means for determining a selected scheduling offset as one of the scheduling offset or the updated scheduling offset; and means for transmitting, using a second uplink time slot, an uplink transmission associated with the downlink transmission, wherein the second uplink time slot is determined based on a first uplink time slot and the selected scheduling offset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
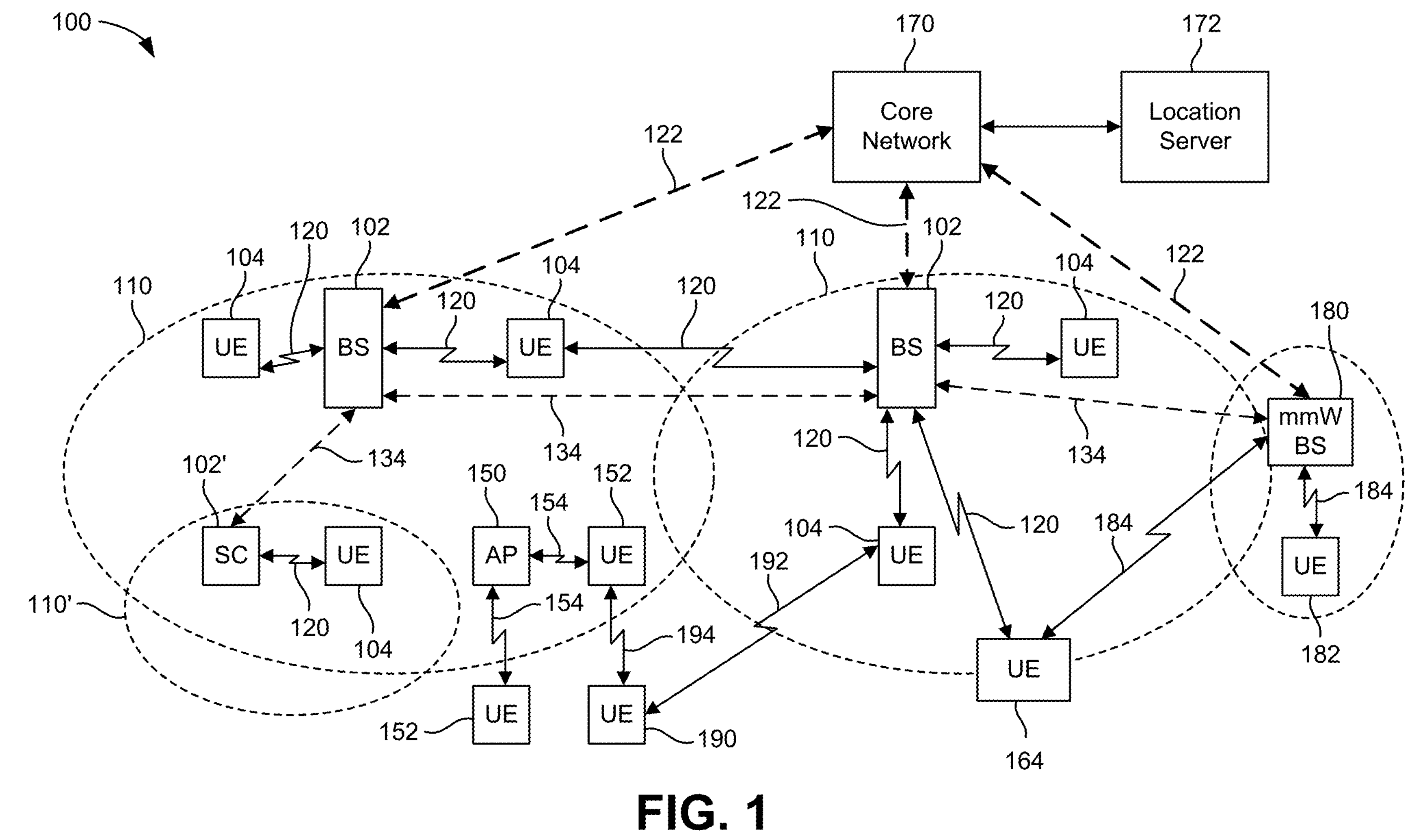
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks are deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (e.g., also referred to as an NR-Uu) between a 3GPP gNB and a UE.

Wireless communications may be exchanged between a UE and a Non-Terrestrial Network (NTN) node or entity. The NTN entity may include a gateway, a base station or portion thereof (e.g., a central unit (CU), a distributed unit (DU), a radio unit (RU), a Near-Real Time (Near-RT) RAN Intelligent Controller (RIC), or a Non-Real Time (Non-RT) RIC, or other NTN node/entity), or one or more satellites or other high-altitude platforms. Based on the relatively large distance between the UE and the NTN node (e.g., a satellite or high-altitude platform or a base station or gateway communicating with the UE via a satellite or high-altitude platform), the wireless communications between the UE and the NTN node can experience relatively large propagation time delays. The propagation time delay can also be referred to as a round trip delay (RTD) and/or a round trip time (RTT). The RTD and/or RTT can be determined based on the physical distance that a wireless communication signal travels (e.g., propagates) between the UE and the NTN node. For example, when a UE communicates with a satellite or a gateway and/or base station via the satellite, the wireless communications between the UE and the satellite, gateway, or base station may travel hundreds, or thousands, of kilometers in distance.

In some examples, a UE can transmit wireless communication signals to an NTN node using one or more timing offsets to perform transmission timing compensation. The one or more timing offsets can include Radio Resource Control (RRC) configuration parameters, such as $K_1$ and $K_2$, for downlink-uplink interactions to establish a timing relationship between a UE and a gateway or base station (e.g., gNB or portion thereof, such as a CU, DU, RU, Near-RT RIC, Non-RT RIC, etc.). The timing relationship can be an uplink timing relationship and/or a downlink timing relationship between the UE and the gateway or base station. For example, a UE can use $K_1$ as a network timing offset to align a scheduled wireless communication transmission with a desired (e.g., different than otherwise scheduled) uplink time slot of the UE. In some examples, a UE may generate wireless communications in multiple different uplink time slots, and each wireless communication can be associated with a different $K_1$ value that causes the UE to transmit all of the wireless communications in the same future uplink time slot. The timing parameter $K_1$ is also referred to herein as a "network timing offset."

When a UE transmits wireless communications to a gateway or base station (e.g., gNB or portion thereof, such as a CU, DU, RU, Near-RT RIC, Non-RT RIC, etc.) that is an NTN node, the RTT or RTD for the transmission to travel between the UE and the NTN node may be outside of (e.g., exceed) the maximum range of timing offset values that can be set for a networking timing offset (e.g., $K_1$). In some cases, an additional timing offset, $K_{offset}$, can be used in establishing the timing relationship (e.g., uplink and/or downlink) between a UE and an NTN node. For example, a $K_{offset}$ value can be determined based on the RTD or RTT between a UE and an NTN node. $K_{offset}$ may also referred to herein as a "scheduling offset." The RTD between a UE and an NTN node (e.g., $RTD_{UE\text{-}NTN\_node}$) can be the amount of time taken for a signal to be transmitted plus the amount of time taken for acknowledgement of that signal having been received. $RTD_{UE\text{-}NTN\_node}$ can include the propagation time(s) for the path(s) between the UE and the NTN node. In NTN networks, where the distance between a UE and a satellite (or base station or gateway communicating with the UE via the satellite) may be hundreds or thousands of kilometers, the RTD/RTT can be on the order of dozens of milliseconds (ms). In some cases, when the satellite is a geosynchronous satellite, the RTD/RTT can be over 100 ms.

A UE can use $K_{offset}$ as a scheduling offset that is added to each of the network timing offsets $K_1$ determined for the UE's uplink transmissions. For example, when a UE is scheduled to transmit multiple wireless communications (e.g., at different uplink time slots), the different uplink time slots can be associated with different $K_1$ values but use the same $K_{offset}$ value. For example, a UE can use the network timing offset $K_1$ to align uplink transmissions to a particular or a desired uplink time slot (e.g., relative to the time slot in which the UE first generates or prepares the uplink transmission). A UE can additionally use the scheduling offset $K_{offset}$ to further shift (e.g., offset) each of its scheduled uplink transmissions by an amount that compensates for or otherwise accommodates the propagation time delay between the UE and the NTN node.

One or more $K_{offset}$ updates can be performed based on a location change of one or more (or both) of satellite 850 and a given UE (e.g., UEs 814*a*, 814*b*). For example, a $K_{offset}$ update can be performed to provide an updated $K_{offset}$ value (e.g., an update scheduling offset) for communications between satellite 850 and a given one of the UEs 814*a*, 814*b*. The updated $K_{offset}$ value can reflect an updated RTD/RTT between the satellite and the UE (e.g., an updated distance/service link length) or an updated RTD/RTT between a base station (or portion thereof) or gateway and the UE, where the base station/gateway communicate with the UE via the satellite.

In some cases, a UE may receive a $K_{offset}$ update command while one or more acknowledgments/negative acknowledgments (e.g., hybrid automatic repeat request (HARQ) ACKs/NACKs) remain in the UEs queue for uplink transmission. An acknowledgement (ACK) can be scheduled as part of a HARQ process and transmitted by the UE to acknowledge that a communication has been successfully decoded, while a negative acknowledgement (NACK) can be scheduled and transmitted by the UE to indicate that a communication has not been successfully decoded. In some cases, the UE may have previously received one or more downlink transmissions for which the UE has not yet transmitted a corresponding ACK/NACK. A conflict or ambiguity may occur as to whether the UE will use the old $K_{offset}$ value to transmit an ACK/NACK (e.g., the $K_{offset}$ value immediately prior to the UE receiving the $K_{offset}$ update command/the $K_{offset}$ at the time the UE received the downlink transmission for which the queued ACK/NACK was generated) or whether the UE will use the new, updated $K_{offset}$ value. A misalignment between the UE and an NTN node (e.g., gNB or base station) as to whether the old $K_{offset}$ or the updated $K_{offset}$ is to be used for the UE's ACKs/NACK can result in a non-causal situation (e.g., the UE and the NTN node are misaligned on the time slot in which the UE's ACKs/NACK are expected). There is a need for systems and techniques that can be used to perform uplink scheduling or transmissions (e.g., HARQ codebook construction for uplink ACK/NACK transmissions, and/or other types of uplink transmissions) when scheduling offset (e.g., $K_{offset}$) updates are received. Other examples of uplink transmissions include a Channel State Information (CSI) report, a Sounding Reference Signal (SRS), among others. As used herein, any reference to an ACK can apply to a NACK, and any reference to a NACK can apply to a ACK.

Systems, apparatuses, processes (also referred to as methods), and computer-readable media (collectively referred to as "systems and techniques") are described herein for uplink (UL) transmission timing in response to scheduling offset updates. For example, the systems and techniques can be used to determine a scheduling offset (e.g., $K_{offset}$) value to use for one or more uplink transmissions that are generated in response to (e.g., to acknowledge (ACK)) receiving a downlink transmission. The systems and techniques can be used to determine a selected $K_{offset}$ value when a $K_{offset}$ update is received or activated after receiving a downlink transmission but before the scheduled transmission time of a responsive uplink transmission (e.g., before the scheduled transmission time of an uplink transmission acknowledging the downlink transmission).

In some aspects, the systems and techniques can determine that a scheduling offset update (e.g., $K_{offset}$ update) has an activation time that occurs between an uplink time slot corresponding to the downlink time slot in which a downlink transmission was received at a UE, and a scheduled uplink transmission time slot calculated by the UE using an old $K_{offset}$ value (e.g., $K_{offset1}$) In some examples, the old $K_{offset1}$ value may always be used when a UE receives a $K_{offset}$ update that activates prior to a scheduled uplink acknowledgement transmission. In some examples, an updated $K_{offset2}$ value may always be used when a UE receives a $K_{offset}$ update that activates prior to a scheduled uplink acknowledgement transmission. In some aspects, a selected $K_{offset}$ value can be determined between the old $K_{offset1}$ and the updated $K_{offset2}$ values based on determining which $K_{offset}$ was active at an uplink time slot calculated using the uplink time slot in which the DL transmission was received (e.g., an uplink time slot N1') and a network timing offset associated with the DL transmission (e.g., $K_1$). In some aspects, the acknowledgement included in the UL transmission can be a Hybrid Automatic Repeat Request (HARQ)

ACK (or NACK). In some examples, the acknowledgement can be a HARQ ACK that is included in a HARQ codebook that includes a plurality of HARQ ACKs.

Various aspects of the present disclosure will be described below with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAE) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (e.g., also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (e.g., or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6000 Megahertz (MHz)), FR2 (e.g., from 24250 to 52600 MHz), FR3 (e.g., above 52600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., also referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
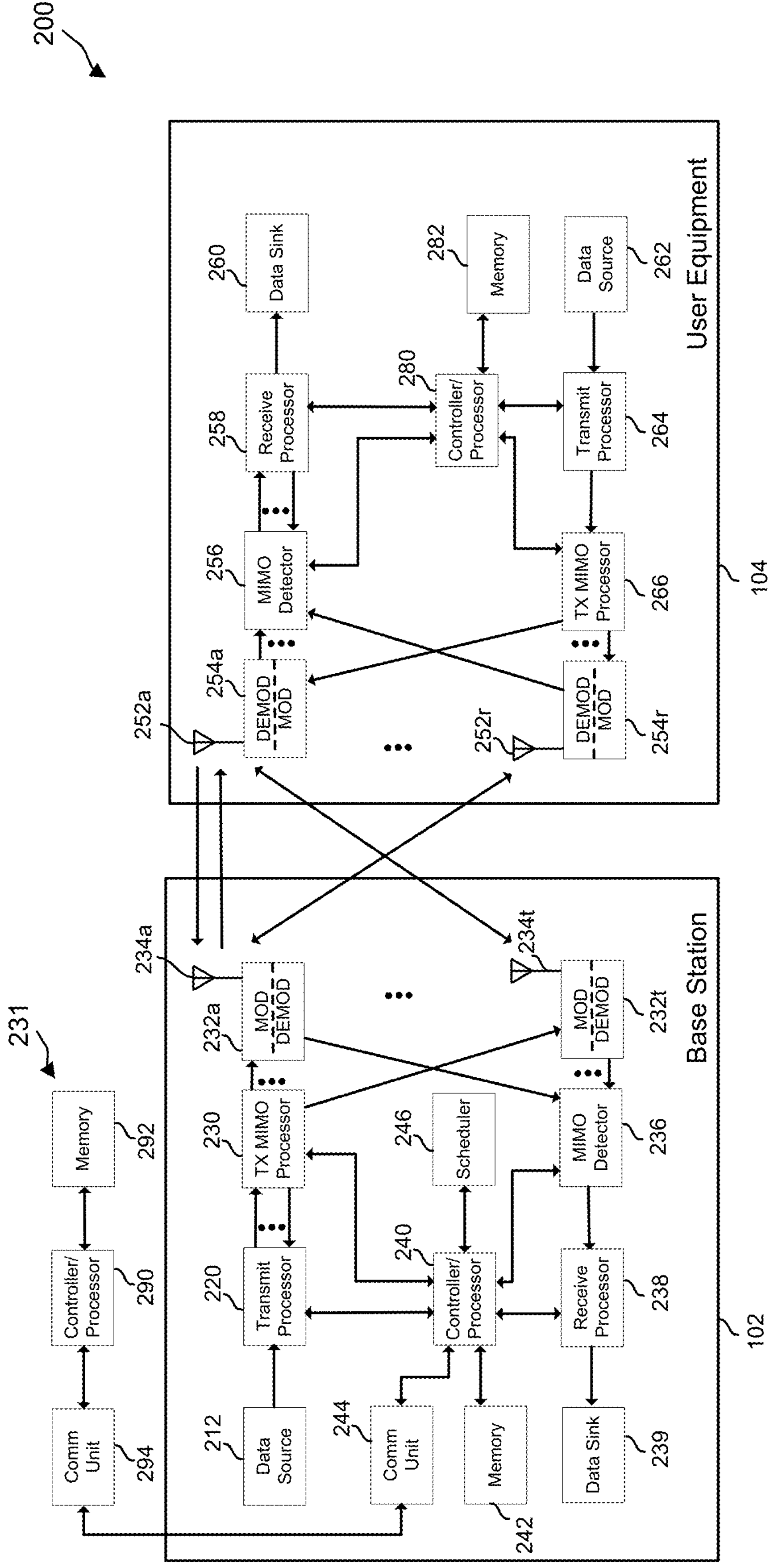
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS))). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
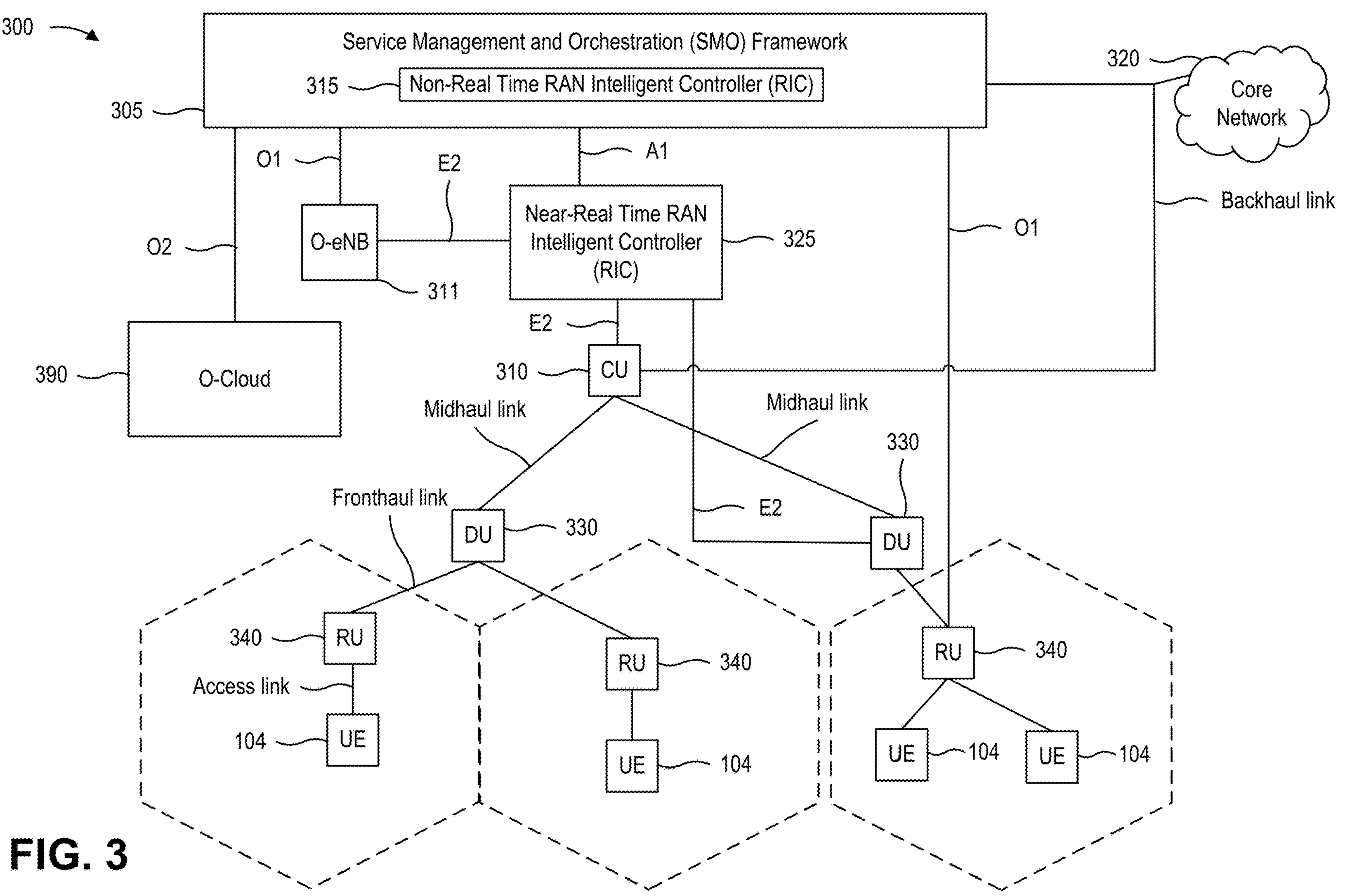
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via 01) or via creation of RAN management policies (e.g., such as A1 policies).

Figure 4:
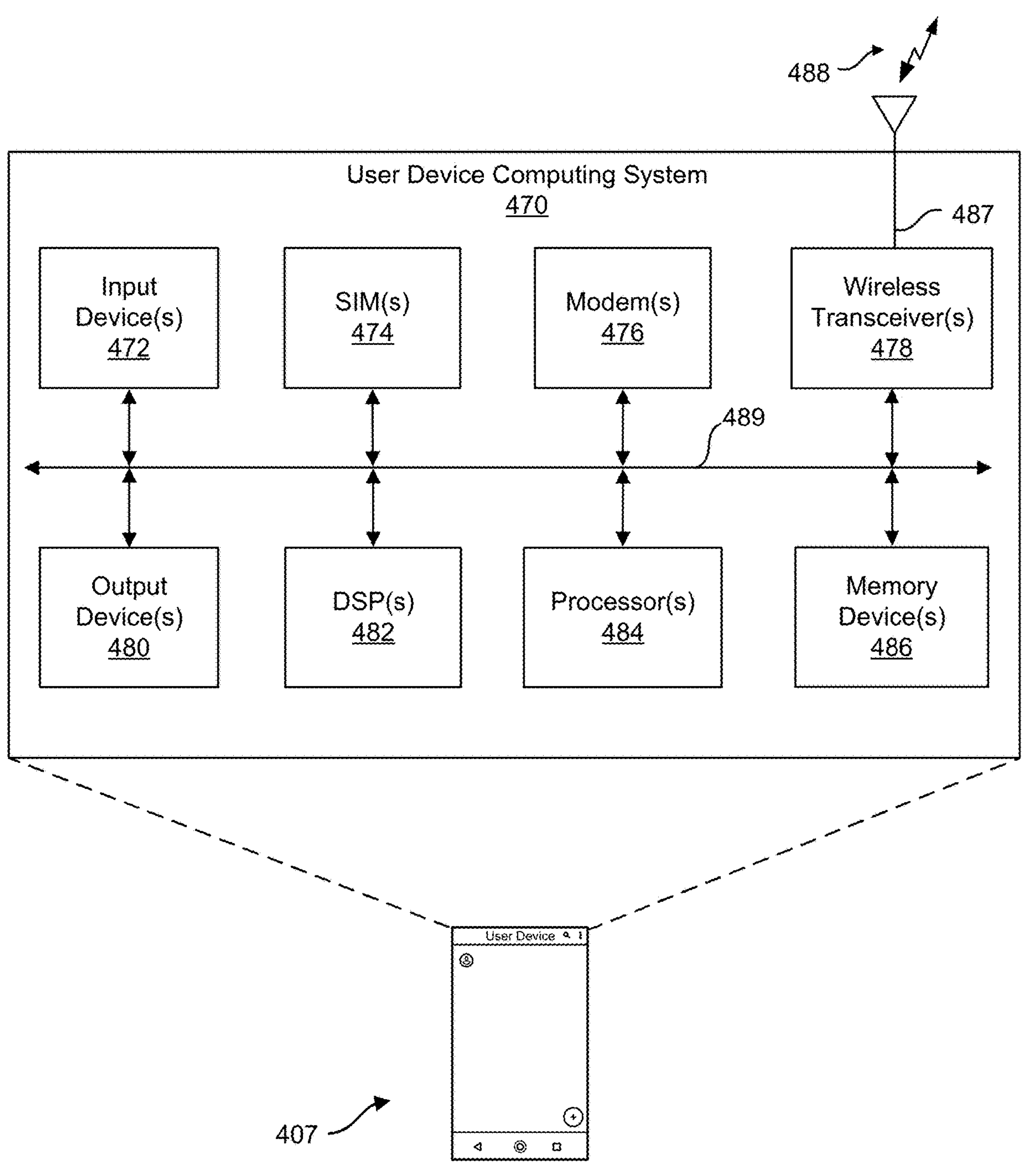
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the wireless device 407 (e.g., a UE) can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) (480), DSP(s) 482, processors (484), memory device(s) 486, and/or antenna(s) 487.

In some aspects, the UE 407 can include means for receiving a downlink transmission in a first downlink time slot and means for receiving an update to a scheduling offset (e.g., $K_{offset}$) associated with a propagation time delay of communications between the UE and a network entity. For example, the update indicates an updated scheduling offset (e.g., an updated $K_{offset}$) different than the scheduling offset. In some aspects, the UE 407 may further include means for transmitting, using a second uplink time slot, an uplink transmission associated with the downlink transmission, wherein the second uplink time slot is determined based on a first uplink time slot and the selected scheduling offset. In some aspects, the UE 407 may further include means for determining a selected scheduling offset as one of the scheduling offset or the updated scheduling offset.

In some examples, the means for receiving can include the one or more wireless transceivers 478, the one or more modems 476, the one or more SIMs 474, the one or more processors 484, the one or more DSPs 482, the one or more memory devices 486, any combination thereof, or other component(s) of the client device. In some examples, the means for determining can include the one or more processors 484, the one or more DSPs 482, the one or more memory devices 486, any combination thereof, or other component(s) of the client device. In some examples, the means for transmitting can include the one or more wireless transceivers 478, the one or more modems 476, the one or more SIMs 474, the one or more processors 484, the one or more DSPs 482, the one or more memory devices 486, any combination thereof, or other component(s) of the client device.

Figures 5A, 5B, 5C:
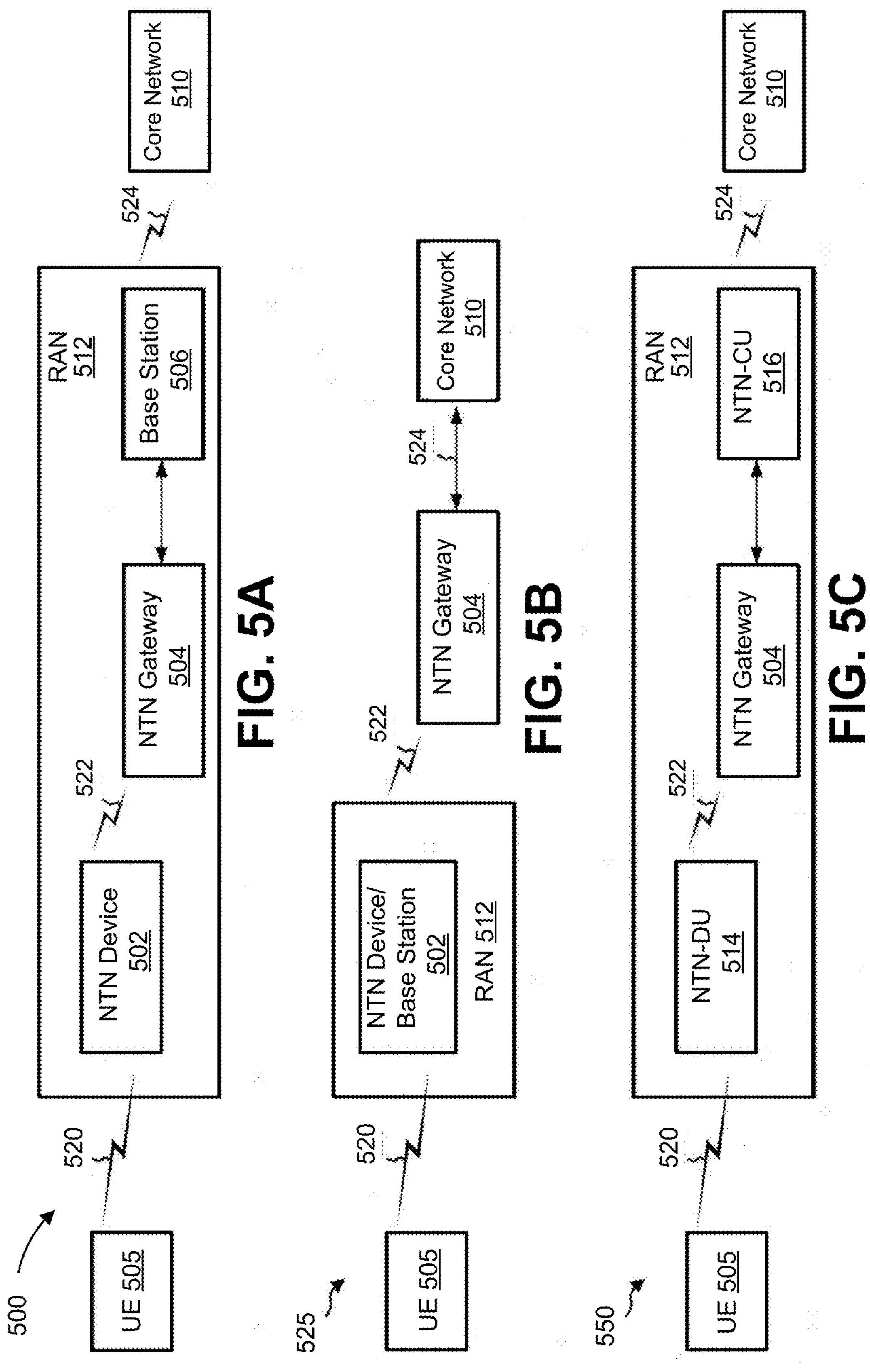
FIGS. 5A, 5B, and 5C are diagrams illustrating examples of a network architecture that supports communication via a Non-Terrestrial Network (NTN) device, in accordance with some examples.

FIG. 5A provides a generalized illustration of various components, any or all of which may be utilized as appropriate, and each of which may be duplicated or omitted, as necessary. The example of FIG. 5A includes one UE 505, although it should be understood that many UEs (e.g., hundreds, thousands, millions, etc.) may utilize the network architecture 500. Similarly, the network architecture 500 may include a larger (or smaller) number of Non-Terrestrial Network (NTN) devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 may be configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a network entity, a gNB, a base station, a network node, a "satellite node", a satellite NodeB (sNB), "satellite access node", etc. The base station 506 may not be the same as terrestrial network gNB s, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU) and the NTN gateway 504 may include or act as Distributed Unit (DU). The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

FIG. 5B shows a diagram of a network architecture 525 capable of supporting NTN access (e.g., using 5G NR). The network architecture 525 shown in FIG. 5B is similar to that shown in FIG. 5A, with like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/base station may assist in the handover (or transfer) of the UE 505 between different NTN gateways and different control networks. The NTN device 502/base station may hide or obscure specific aspects of the NTN device 502/base station from the core network 510 (e.g., by interfacing to the core network 510 in the same way or in a similar way to a terrestrial network base station). The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low Earth orbit (LEO) devices, the NTN device 502/base station may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

FIG. 5C is a diagram of a network architecture 550 capable of supporting NTN access (e.g., using 5G NR). The network architecture shown in FIG. 5C is similar to that shown in FIGS. 5A and 5B, with like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU) and a Distributed Unit (DU). In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (F1AP), and together may perform some or all of the same functions as the base station 506 or the NTN device 502/base station as described in connection with FIGS. 5B and 5C, respectively. The NTN-DU 514 may terminate the radio interface and associated lower-level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station. The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the core network 510 (e.g., by interfacing to the core network 510 in the same way or in a similar way to a terrestrial network base station).

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514. In some aspects, the NTN device may correspond to a high altitude platform system (HAPS) that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. For example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 6:
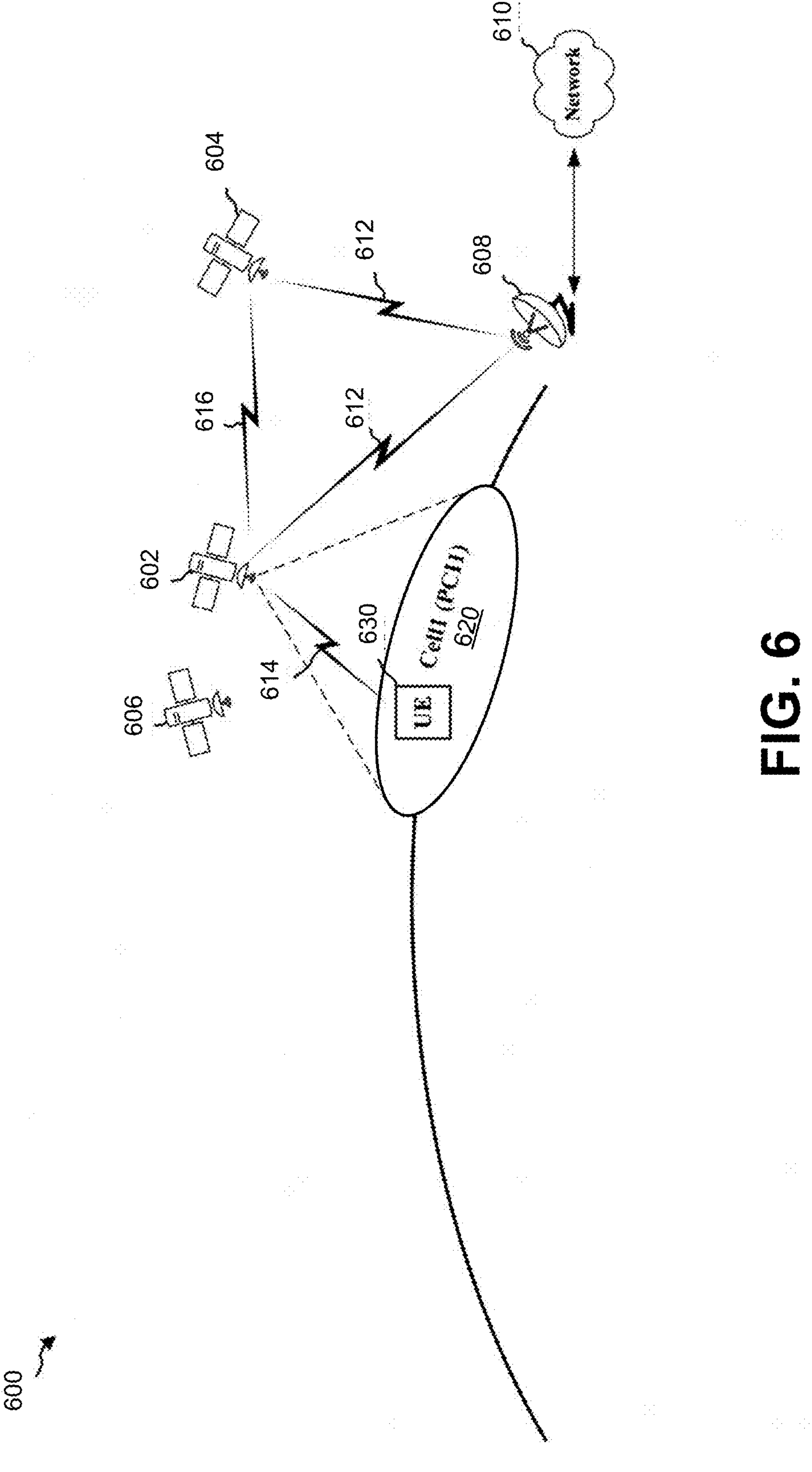
FIG. 6 is a diagram illustrating an example of an NTN configuration, in accordance with some examples.

FIG. 6 illustrates an example of an NTN 600 configuration. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA) (e.g., in altitudes typically between 8 and 50 km including High Altitude Platforms (HAPs)).

In some aspects, the NTN 600 may include an NR-NTN. The example of FIG. 6 provides that the NTN 600 may include a first NTN device 602, a second NTN device 604, a third NTN device 606, an NTN gateway 608, a data network 610, and a UE 630 within a cell coverage of the first NTN device 602. In some aspects, the UE 630 may include IoT devices, and the UE may be connected to the NTN 600 for wireless communication.

The NTN gateway 608 may be one of one or more NTN gateways that may connect the NTN 600 to a public data network. In some examples, the NTN gateway 608 may support functions to forward a signal from the NTN device to a Uu interface, such as an NR-Uu interface. In other examples, the NTN gateway 608 may provide a transport network layer node, and may support transport protocols, such as acting as an IP router. A satellite radio interface (SRI) may provide IP trunk connections between the NTN gateway 608 and the NTN device to transport NG or F1 interfaces, respectively. One or more geosynchronous equatorial orbit (GEO) devices (e.g., which may be referred to herein as the first NTN device 602, the second NTN device 604, or the third NTN device 606) may be fed by the NTN gateway 608, and the one or more NTN devices may be deployed across the satellite targeted coverage, which may correspond to regional coverage or even continental coverage. A non-GEO device may be served successively by one or more NTN gateways at a time, and the NTN 600 may be configured to provide service and feeder link continuity between the successive serving NTN gateways with time duration to perform mobility anchoring and handover.

The first NTN device 602, including spaceborne vehicles or airborne vehicles, may communicate with the data network 610 through a feeder link 612 established between the first NTN device 602 and the NTN gateway 608 in order to provide service to the UE 630 within the cell coverage, or a field-of-view of an NTN cell 620, of the first NTN device 602 via a service link 614. The feeder link 612 may include a wireless link between an NTN gateway and an NTN device. The service link 614 may refer to a radio link between an NTN device (e.g., the first NTN device 602) and the UE 630. In some examples, the first NTN device 602 may use one or more directional beams (e.g., beamforming) to exchange communication with the UE 630. A beam may refer to a wireless communication beam generated by an antenna on-board an NTN device.

In some examples, the UE 630 may communicate with the first NTN device 602 via the service link 614. The second NTN device 604 may relay the communication for the first NTN device 602 through an inter-satellite link (ISL) 616, and the second NTN device 604 may communicate with the data network 610 through the feeder link 612 established between the second NTN device 604 and the NTN gateway 608. The ISL links may be provided between a constellation of satellites and may involve the use of transparent payloads on-board the NTN devices. The ISL may operate in an RF frequency or an optical band.

In the illustrated example of FIG. 6, the first NTN device 602 may provide the NTN cell 620 with a first physical cell ID (PCI) ("PCI1"). In some examples, a constellation of satellites may provide coverage to the NTN cell 620. For example, the first NTN device 602 may include a non-GEO device that does not appear stationary with respect to the Earth. As such, a satellite constellation (e.g., one or more satellites) may be configured to provide coverage to the NTN cell 620. For example, the first NTN device 602 and the third NTN device 606 may be part of a satellite constellation that provides coverage to the NTN cell 620.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Wireless communication between a UE and an NTN node (e.g., a base station and/or a gNB) can experience large propagation time delays, for example based on the distance that a wireless communication signal travels between the UE and the NTN node. For example, when the NTN node is a payload or otherwise is embarked onboard a satellite and/or other high-altitude platform station, wireless communications between the UE and the NTN node may propagate over distances that are hundreds, or thousands, of kilometers in length (e.g., such as over service link 614 illustrated in FIG. 6). In some examples, a UE can transmit wireless communication signals to an NTN node using one or more timing offsets to perform transmission timing compensation (e.g., transmission timing compensation based at least in part on the propagation time delay between the UE and the NTN node and/or the propagation time delay along the length of a service link between the UE and the NTN node).

The one or more timing offsets can include Radio Resource Control (RRC) configuration parameters, such as $K_1$ and $K_2$, for downlink-uplink interactions to establish a timing relationship between a UE and a gateway or gNB. The timing relationship can be an uplink timing relationship and/or a downlink timing relationship between the UE and the gateway/gNB, as will be described in greater depth below.

A UE can use $K_1$ (and/or $K_2$) as a network timing offset to align a scheduled wireless communication transmission with a desired (e.g., different than otherwise scheduled) uplink time slot at the UE. For example, if a UE generates or is otherwise ready to transmit a wireless communication in uplink time slot n, a value of $K_1=2$ may cause the UE to offset the transmission timing of the wireless communication to a later uplink time slot $n+K_1$. In some examples, a UE may generate wireless communications in multiple different uplink time slots, and each wireless communication can be associated with a different $K_1$ value that causes the UE to transmit all of the wireless communications in the same future uplink time slot. In some aspects, the timing parameter $K_1$ (and/or $K_2$) may also referred to herein as a "network timing offset."

In some examples, when a UE transmits wireless communications to a gateway or gNB that is an NTN node (e.g., or otherwise associated with an NTN network), the propagation time delay for the transmission to travel between the UE and the NTN node may be outside of (e.g., may exceed) the maximum range of timing offset values that can be taken by existing configuration parameters such as $K_1$ and/or $K_2$. In some cases, an additional timing offset, $K_{offset}$, can be used in establishing the timing relationship (e.g., uplink and/or downlink) between a UE and an NTN node.

$K_{offset}$ values can be determined based on the round-trip delay (RTD) between the UE and the NTN node. The RTD between a UE and an NTN node (e.g., $RTD_{UE\text{-}NTN\_node}$) can be the amount of time taken for a signal to be sent plus the amount of time taken for acknowledgement of that signal having been received. $RTD_{UE\text{-}NTN\_node}$ includes the propagation time(s) for the path(s) between the UE and the NTN node. For example, in NTN networks, the distance between a satellite and a UE and/or the distance between a satellite and a gNB can be hundreds, or thousands, of kilometers, which can result in an RTD of dozens of milliseconds (ms). In some cases, when the satellite is a geosynchronous satellite, the RTD can be over 100 ms.

In some cases, $K_{offset}$ can be greater than $K_1$. For example, $K_{offset}$ can be determined such that $K_{offset}>RTD_{UE\text{-}NTN\_node}$. In some aspects, $K_{offset}$ may also be referred to herein as a "scheduling offset." In one illustrative example, a UE can use a $K_{offset}$ value as a scheduling offset that is added to each of the network timing offsets $K_1$ that are determined for each of the UE's generated uplink transmissions. For example, when a UE generates multiple wireless communications (e.g., at different uplink time slots), the different uplink time slots can be associated with different $K_1$ values but use the same $K_{offset}$ value. For example, a UE can use the network timing offset $K_1$ to align uplink transmissions into a particular or a desired uplink time slot (e.g., relative to the time slot in which the UE first generates or prepares the uplink transmission). A UE can additionally use the scheduling offset $K_{offset}$ to further shift (e.g., offset) each of its generated uplink transmissions by an amount that compensates for or otherwise accommodates the propagation time delay between the UE and the NTN node.

Figure 7:
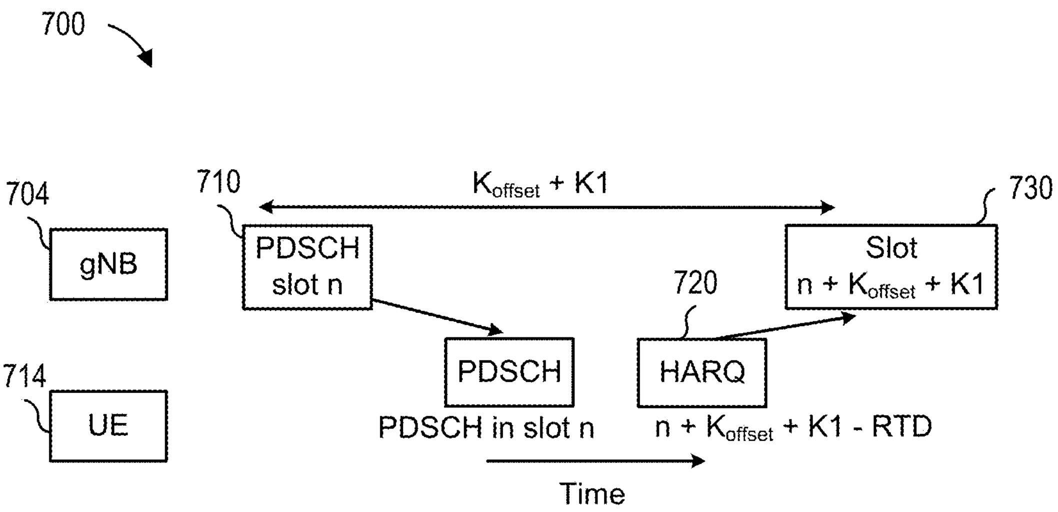
FIG. 7 is a diagram illustrating an example timing relationship, in accordance with some examples.

FIG. 7 is a diagram illustrating an example timing relationship 700 between a gNB 704 (e.g., an NTN node or a gNB included in an NTN network) and a UE 714. In some examples, gNB 704 can be the same as or similar to one or more of the gNB 804*a* and/or the gateway 804*b* illustrated in FIG. 8. In one illustrative example, one or more $K_{offset}$ values can be used to implement a Physical Downlink Shared Channel (PDSCH) to Hybrid Automatic Repeat Request (HARD) feedback (e.g., including an acknowledgement (ACK) or a negative acknowledgement (NACK) timing enhancement, as will be described in greater depth below. In some examples, the example timing relationship 700 may include one or more satellites or high-altitude platform stations relaying communications between gNB 704 and UE 714 (e.g., such as satellite 850 illustrated in FIG. 8).

As illustrated in FIG. 7, gNB 704 transmits a downlink communication 710 to UE 714 in a downlink time slot n. In some cases, downlink and uplink time slots can be aligned at gNB 704 but may not be aligned at or with UE 714, as will be described in greater depth below. The gNB 704 can transmit downlink communication 710 using a Physical Downlink Shared Channel (PDSCH) as the physical channel to carry Downlink Shared Channel (DL-SCH) data. Downlink communication 710 can also be referred to as "PDSCH 710."

UE 714 receives the PDSCH 710 at some later time, and may be required to transmit feedback (e.g., an acknowledgement (ACK) or negative acknowledgement (NACK)) in response to a successful (or unsuccessful) reception of the PDSCH downlink transmission 710. In one illustrative example, UE 714 may generate and transmit a HARQ ACK 720 for the PDSCH downlink transmission 710. While an ACK 720 is used as an illustrative example, any technique or process described herein with reference to an ACK can apply to a NACK.

The $K_1$ timing parameter (e.g., network timing offset) and the $K_{offset}$ timing parameter (e.g., scheduling offset) can be used to establish a timing relationship between UE 714 and gNB 704, as was mentioned previously. For example, $K_1$ and/or $K_{offset}$ can be signaled or otherwise communicated by gNB 704 (or an NTN network associated with gNB 704) to UE 714. Based on the $K_1$ value associated with or signaled for the PDSCH downlink transmission 710 and the $K_{offset}$ value associated with UE 714 (e.g., a UE-specific $K_{offset}$) or a cell in which UE 714 is located (e.g., a cell-specific $K_{offset}$), UE 714 can determine an uplink time slot for transmitting the HARQ ACK 720. In some aspects, $K_1$ and $K_{offset}$ can be used to determine the time slot in which gNB 704 expects to receive HARQ ACK 720.

For example, $K_1+K_{offset}$ can represent the delay or offset between the time (e.g., time slot) in which gNB 704 transmits PDSCH downlink transmission 710 and the time (e.g., time slot) in which gNB 704 receives HARQ ACK 704 in response. As illustrated in FIG. 7, at gNB 704, $K_1+K_{offset}$ is the delay or offset between PDSCH 710 and the received HARQ ACK 730. In some examples, for a downlink transmission sent in time slot n, gNB 704 may expect to receive from UE 714 a corresponding ACK for the downlink transmission in (or no later than) time slot $n+K_1+K_{offset}$.

After receiving PDSCH 710, UE 714 can determine the appropriate uplink time slot for transmitting HARQ ACK 720 such that gNB 704 will receive the HARQ ACK 720 by time slot $n+K_1+K_{offset}$. For example, UE 714 may determine that HARQ ACK 720 should be transmitted in uplink time slot $n+K_1+K_{offset}$— RTD, where RTD is the RTD between UE 714 and gNB 704. Because $K_{offset}$ (or $K_{offset}+K_1$) is greater than the RTD between UE 714 and gNB 704, UE 714 transmits HARQ ACK 720 in an uplink time slot that is later than n.

In some cases, $K_{offset}$ may change or be updated over time (e.g., as the distance/RTD between UE 714 and gNB 704 changes). For example, $K_{offset}$ can be updated based on a location change by UE 714 and/or a location change by an NTN satellite that relays communications between UE 714 and gNB 704, as will be described in greater depth below with respect to FIG. 8.

Figure 8:
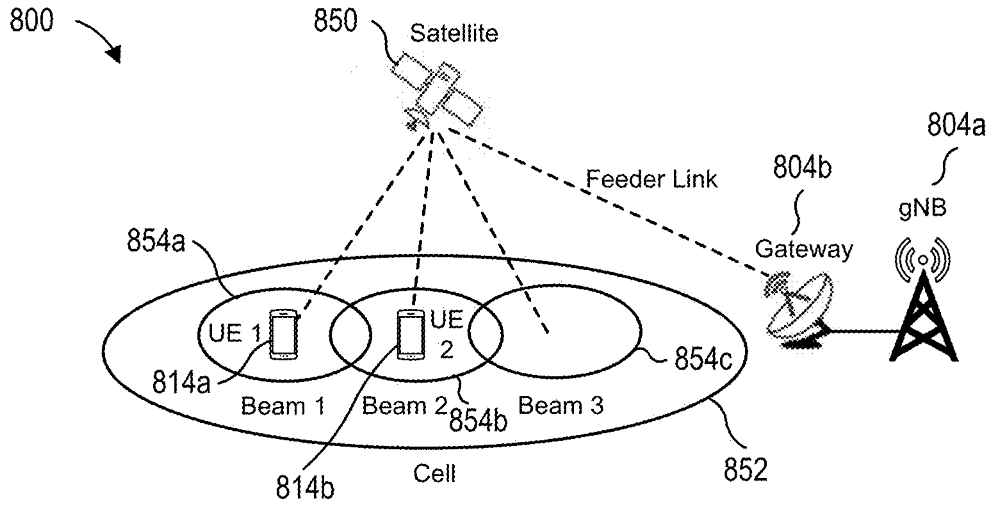
FIG. 8 is a diagram illustrating an example of a wireless communications network, in accordance with some examples.

FIG. 8 is a diagram illustrating an example of a wireless communications network 800, in accordance with some aspects of the present disclosure. In some examples, wireless communication network 800 is an NTN network. As illustrated, wireless communication network 800 (e.g., NTN network) includes a gNB 804*a* and a gateway 804*b*, which may use one or more intermediate nodes (e.g., such as satellite 850) to communicate with one or more UEs (e.g., such as UEs 814*a* and 814*b*).

Satellite 850 can be associated with a cell 852, which may represent an area in which wireless communication between satellite 850 and one or more UEs within cell 852 can be performed. For example, UEs located outside of cell 852 may be unable to communicate with satellite 850, and vice versa. Cell 852 can include one or beams 854*a*, 854*b*, and 854*c*, which originate from satellite 850 and are each associated with a sub-area of the overall cell 852. The beams 854*a*-854*c* can be used to provide wireless communications between satellite 850 and one or more UEs. For example, as illustrated, a first beam 854*a* can be used to provide wireless communications between satellite 850 and a first UE 814*a* and a second beam 854*b* can be used to provide wireless communications between satellite 850 and a second UE 814*b*.

Different beams can be associated with different locations or areas within the cell 852. Based on the location of a given beam (e.g., and the location of a given UE within the given beam), the length of the service links between satellite 850 and the UEs 814*a* and 814*b* can change. For example, the service link shown as the dotted line between satellite 850 and first UE 814*a* may be longer than the service link shown as the dotted line between satellite 850 and second UE 814*b*. As the length of a service link between satellite 850 and a given one of the UEs 814*a*, 814*b* changes, the RTD between satellite 850 and then given UE also changes (e.g., a longer RTD for a longer service link, a shorter RTD for a shorter service link).

As mentioned previously, in some cases $K_{offset}$ can be determined based at least in part on the RTD between a UE and an NTN node (e.g., a base station, gateway 804*b*, gNB 804*a*, etc.). In one illustrative example, UE-specific $K_{offset}$ values can be determined based on the relative position of each UE 814*a*, 814*b* within the cell 852. In some aspects, UE-specific $K_{offset}$ values can be determined based on a distance (e.g., propagation time delay) between each UE 814*a*, 814*b* and satellite 850. For example, first UE 814*a* can be associated with a first UE-specific $K_{offset}$ value that is greater than a second UE-specific $K_{offset}$ value associated with second UE 814*b*.

In some examples, a cell-specific $K_{offset}$ can be determined for cell 852. For example, the cell-specific $K_{offset}$ for cell 852 can be the largest possible RTD between any UE within cell 852 and the NTN node (e.g., a base station, gateway 804*b*, gNB 804*a*, etc.). Each UE-specific $K_{offset}$ that may be calculated for a UE within cell 852 can be less than or equal to the cell-specific $K_{offset}$ associated with cell 852.

In some cases, one or more $K_{offset}$ updates can be performed based on a location change of one or more (or both) of satellite 850 and a given UE (e.g., UEs 814*a*, 814*b*). For example, a $K_{offset}$ update can be performed to provide an updated $K_{offset}$ value (e.g., an update scheduling offset) for communications between satellite 850 and a given one of the UEs 814*a*, 814*b*. The updated $K_{offset}$ value can reflect an updated RTD between the satellite and the UE (e.g., an updated distance/service link length). In one illustrative example, a $K_{offset}$ update can be performed. In some examples, $K_{offset}$ updates can be performed for both the cell-specific $K_{offset}$ associated with cell 852 and can be performed for the UE-specific $K_{offset}$ associated with each of the UEs 814*a*, 814*b*. In one illustrative example, a $K_{offset}$ update process can be performed approximately every 30-40 seconds, although larger or smaller update intervals can also be utilized.

In some cases, a UE may receive a $K_{offset}$ update command while one or more acknowledgments (e.g., HARQ ACKs) remain in the UEs queue for uplink transmission. For example, the UE may have previously received one or more downlink transmissions (e.g., such as PDSCH 710) for which the UE has not yet transmitted a corresponding ACK. A conflict or ambiguity may occur as to whether the UE will use the old $K_{offset}$ value to transmit a queued ACK (e.g., the $K_{offset}$ value immediately prior to the UE receiving the $K_{offset}$ update command/the $K_{offset}$ at the time the UE received the downlink transmission for which the queued ACK was generated) or whether the UE will use the new, updated $K_{offset}$ value.

In some cases, a misalignment between the UE and an NTN node (e.g., gNB or base station) as to whether the old $K_{offset}$ or the updated $K_{offset}$ is to be used for the UE's ACKs can result in a non-causal situation (e.g., the UE and the NTN node are misaligned on the time slot in which the UE's ACKs are expected). Described herein are systems and techniques for HARQ codebook construction and uplink acknowledgment transmissions with scheduling offset (e.g., $K_{offset}$) updates.

Figure 9:
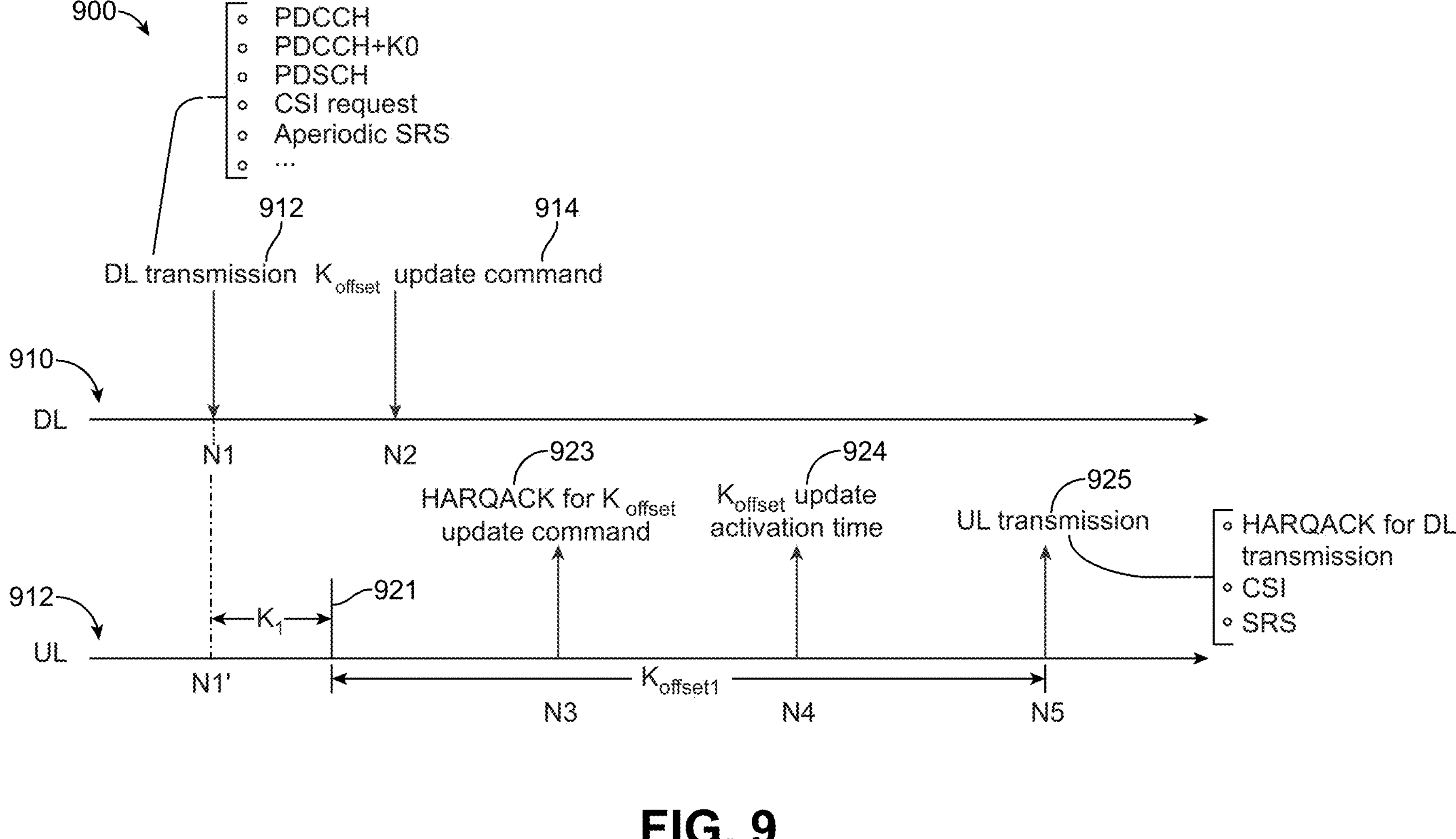
FIG. 9 is a diagram illustrating an example of a $K_{offset}$ update flow, in accordance with some examples.

FIG. 9 is a diagram illustrating an example $K_{offset}$ update flow 900. The example $K_{offset}$ update flow 900 includes a downlink transmission side 910 and an uplink transmission side 920. Both downlink transmission side 910 and uplink transmission side 920 are depicted along a horizontal axis, which can be a time axis and/or contain a plurality of uplink and downlink time slots, respectively. Downlink transmission side 910 and uplink transmission side 920 can be associated with a UE (e.g., UE 714, 814*a*, 814*b*, etc.) in communication with an NTN node (e.g., gNB 704, gNB 804*a*, gateway 804*b*, a base station, etc.). The NTN node can be associated with the downlink transmission side 910.

As illustrated, the UE can receive a downlink (DL) transmission 912 at a downlink time slot N1. DL transmission 912 can include or be scheduled by one or more of a Physical Downlink Control Channel (PDCCH) transmission (e.g., scheduled by the PDCCH transmission), a PDCCH+$K_0$ transmission, a PDSCH transmission (e.g., such as PDSCH 710 illustrated in FIG. 7), a Channel State Information (CSI) request, and/or an aperiodic Sounding Reference Signal (SRS), etc. In some aspects, DL transmission 912 can include or be scheduled by one or more of: a PDSCH candidate reception, a PDSCH reception, a Semi-Persistent Scheduling (SPS) release, a Transmission Configuration Indicator (TCI) update, a PDCCH that requires a HARQ ACK, a PDCCH that schedules a PDSCH, a PDCCH determined by a PDCCH monitoring occasion, etc. In some aspects, the PDCCH transmission schedules a PUSCH transmission. In some aspects, the PDCCH transmission provides information about a PDSCH.

In some examples, the UE may generate one or more corresponding acknowledgements based on the type of DL transmission 912 that is received at downlink time slot N1. For example, the UE can generate and transmit a corresponding acknowledgement as the uplink (UL) transmission 925, which is transmitted at a calculated uplink time slot N5 (e.g., described in greater depth below). In some aspects, the UL transmission 925 can include one or more of a HARQ ACK (e.g., ACK or NACK), CSI, and/or SRS, etc., generated based at least in part to corresponding to the type of DL transmission 912 that was received at downlink time slot N1. In one illustrative example, the UL transmission 925 can include a HARQ codebook. The HARQ codebook can include multiple HARQ ACKS, wherein each HARQ ACK is generated for a different DL transmission and/or a different DL transmission received in a different downlink time slot.

In a subsequent downlink time slot N2 (e.g., after receiving DL transmission 912 in downlink time slot N1), the UE may receive a $K_{offset}$ update command 914. For example, $K_{offset}$ update command 914 can be associated with a MAC Control Element (MAC CE) that can be activated and used to modify the $K_{offset}$ value utilized by the UE. A MAC CE $K_{offset}$ update command can be received at the MAC layer from the NTN network associated with the UE. In some examples, $K_{offset}$ update command 914 can include a Downlink Control Information (DCI) signal, a Radio Resource Control (RCC) signal, a Receiver Operating Characteristic (ROC) signal, and/or a system information update signal (e.g., sent via a System Information Block (SIB)), etc.

In one illustrative example, the UE can generate and transmit a HARQ ACK 923 in an uplink time slot N3, wherein the HARQ ACK 923 acknowledges (e.g., to the NTN or base station) the reception of $K_{offset}$ update command 914. The $K_{offset}$ update command 914 can be associated with a $K_{offset}$ update activation time 924, which activates the $K_{offset}$ update by changing the UE's $K_{offset}$ from its previous value to the updated $K_{offset}$ value associated with $K_{offset}$ update command 914. As illustrated, $K_{offset}$ update activation time 924 can occur at uplink time slot N4. Uplink time slot N4 can be later than downlink time slot N2 (e.g., in which $K_{offset}$ update command 914 is received) and later than uplink time slot N3 (e.g., in which HARQ ACK 923 is transmitted to acknowledge reception of $K_{offset}$ update command 914). In some examples, $K_{offset}$ update activation time 924 can occur at a pre-determined amount of time after the transmission of HARQ ACK 923 (e.g., uplink time slot N4 may be equal to uplink time slot N3 plus a pre-determined amount of time). For example, $K_{offset}$ activation time 924 can occur 3 ms after HARQ ACK 923 is transmitted in uplink time slot N3. In some aspects, HARQ ACK 923 can be transmitted in an uplink time slot that is also pre-determined or planned between the UE and the NTN network/NTN node (e.g., uplink time slot N3 may be equal to downlink time slot N2 plus a pre-determined amount of time).

Based on receiving the $K_{offset}$ update command 914 triggering a $K_{offset}$ update activation 924 in an uplink time slot (e.g., uplink time slot N4) that falls after the reception of DL transmission 912, but before the transmission of UL transmission 925 (e.g., acknowledging DL transmission 912), the UE can determine which $K_{offset}$ value to use in calculating an uplink time slot for UL transmission 925. For example, the UE can determine whether the old $K_{offset}$ (e.g., the $K_{offset}$ value prior to $K_{offset}$ update command 914) or the updated $K_{offset}$ (e.g., based on $K_{offset}$ update command 914) should be used to calculate the uplink time slot for transmitting the acknowledgement (e.g., UL transmission 925) of DL transmission 912.

As illustrated, the uplink time slot N5 associated with UL transmission 925 can be determined based on the original $K_{offset}$ value (e.g., the $K_{offset}$ value when DL transmission 912 was received). In one illustrative example, the UE can determine the initially scheduled uplink time slot N5 based on an uplink time slot N1' determined to overlap with (e.g., correspond to) the downlink time slot N1. In some cases, when the DL time slots of the downlink transmission side 910 and the UL time slots of the uplink transmission side 920 are aligned at the UE, downlink time slot N1 and uplink time slot N1' can be the same. In some examples, the DL time slots 910 of the downlink transmission side 910 and the UL time slots 920 of the uplink transmission side 920 may not be aligned (e.g., in which case the calculated overlapping uplink time slot N1' is different than the downlink time slot N1). For example, the uplink time slots and the downlink time slots may have different sub-carrier spacing, which may cause the uplink time slot duration to be different than the downlink time slot duration.

Figure 10A:
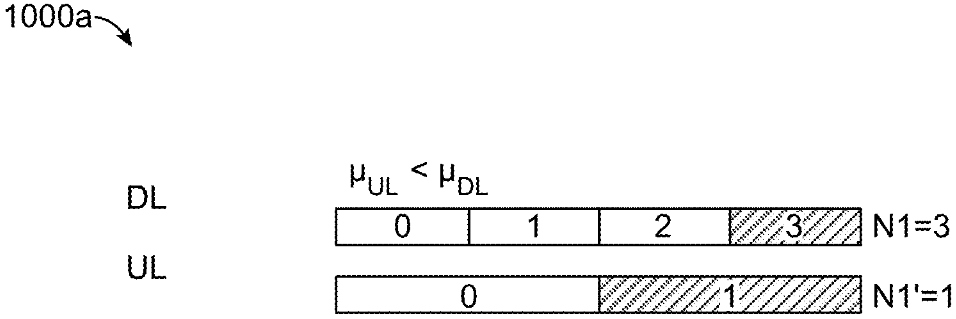
FIG. 10A is a diagram illustrating an example of overlapping downlink (DL) and uplink (UL) time slots, in accordance with some examples.
Figure 10B:
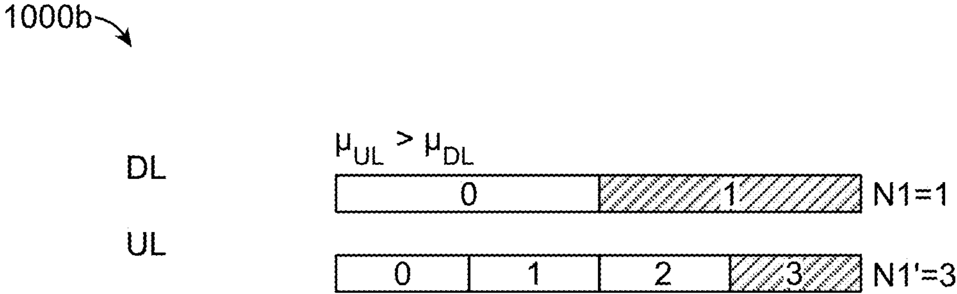
FIG. 10B is a diagram illustrating another example of overlapping DL and UL time slots, in accordance with some examples.

FIGS. 10A and 10B are diagrams illustrating example overlapping downlink (DL) and uplink (UL) time slots. For example, FIG. 10A is a diagram 1000*a* depicting an example in which the UL slots have a greater time slot duration than the DL slots and FIG. 10B is a diagram 1000*b* depicting an example in which the UL slots have lesser time slot duration than the DL slots. In the example of FIG. 10A, downlink time slot 3 may be the same as the downlink time slot N1 in which DL transmission 912 was received in FIG. 9 (e.g., downlink time slot N1=3). Here, because the UL slots have a longer time slot duration than the DL slots, the corresponding (e.g. overlapping) uplink time slot N1' associated with DL slot 3 is uplink time slot 1 (e.g., N1'=1). In the example of FIG. 10B, downlink time slot 1 may be the same as the downlink time slot N1 of FIG. 9 (e.g., the downlink time slot in which DL transmission 912 was received). Here, because the UL slots have a shorter time slot duration the DL slots, the corresponding (e.g., overlapping) uplink time slot N1' associated with N1=DL slot 1 is the uplink time slot 3 (e.g., N1'=3). As illustrated in FIG. 10B, both uplink slot 2 and uplink slot 3 overlap with a portion of the N1 slot given by DL slot 1; in some aspects, uplink slot 3 is chosen for N1' rather than uplink slot 2 because uplink slot 3 is more recent in time.

In one illustrative example, the uplink time slot N1' can be determined as follows:

$$N1' = \left\lfloor 2^{\frac{\mu_{UL}}{\mu_{DL}}}(N1+1)-1 \right\rfloor$$

Here, $\mu_{UL}$ is the UL Subcarrier Spacing (SCS) index (e.g., indicating SCS of $2^{\mu_{UL}}$ KHz), and $\mu_{DL}$ is the DL SCS index.

In some examples, if DL transmission 912 is or is scheduled by a PDCCH that is received at downlink time slot N0 and carries a DCI scheduling a PDSCH, the uplink time slot N1' can be determined as N1'=N0'+K0. Here, K0 is the DCI to PDSCH timing offset and N0' is an uplink time slot (e.g., the last or most recent uplink time slot) overlapping with the downlink time slot N0. The uplink time slot N0' can be calculated using, or based on, the equation given above for N1'.

As illustrated in FIG. 9, the uplink time slot N1' (e.g., the uplink time slot associated with the downlink time slot N1 in which the DL transmission 912 was received) can be used to determine an initially scheduled uplink time slot N5 for UL transmission 925. For example, using the original (e.g., non-updated) $K_{offset}$ value, denoted here as $K_{offset1}$, the initially scheduled uplink time slot N5 can be determined as:

$$N5=N1'+K_1+K_{offset1}$$

$K_1$ is a network timing offset (e.g., as described previously above). In some examples, the network timing offset $K_1$ can be a PDSCH-to-HARQ-ACK timing offset associated with the DL transmission 912. $K_{offset1}$ is the scheduling offset that was configured by the NTN network or that was otherwise currently active at the downlink time slot N1 (e.g., when DL transmission 912 was received).

In some examples, the initially scheduled uplink time slot N5 can also be referred to as "a virtual time slot" or a "virtual uplink time slot." For example, virtual time slot N5 may be the uplink time slot in which the UL transmission 925 (e.g., acknowledging DL transmission 912) would be sent in the absence of (e.g., or ignoring) the $K_{offset}$ update command 914 and the subsequent $K_{offset}$ update activation 924. In some aspects, the $K_{offset}$ update activation 924 can change (e.g., update) the current $K_{offset}$ value from $K_{offset1}$ to $K_{offset2}$. $K_{offset1}$ and/or $K_{offset2}$ can be a UE-specific $K_{offset}$ or can be a cell-specific $K_{offset}$. In some examples, $K_{offset1}$ and $K_{offset2}$ are both the same type of $K_{offset}$.

In one illustrative example, in response to receiving a command (e.g., $K_{offset}$ update command 914) that updates the scheduling offset (e.g., $K_{offset}$) used by a UE, the UE can determine the activation or application time associated with the update. If the UE determines that the $K_{offset}$ update 924 time slot N4 occurs between the uplink time slot N1' and the virtual uplink time slot N5 (e.g., N1'<N4<N5), the UE can determine a transmission timing for UL transmission 925 in response to DL transmission 912.

In some aspects, the UE can utilize the old $K_{offset}$ (e.g., $K_{offset1}$) to transmit UL transmission 925. For example, the UE can use the virtual uplink time slot N5 as the actual uplink time slot for transmitting a HARQ ACK back to an NTN node (e.g., base station or gNB associated with DL transmission 912). In this example, the UE may utilize the old $K_{offset1}$ value as the scheduling offset for UL transmission 925 and may disregard the new $K_{offset2}$ value, even though $K_{offset2}$ was activated prior to the virtual uplink time slot N5. In this example, a UE can determine the actual uplink time slot to use for UL transmission 925 as:

$$\text{uplink time slot}=N5=N1'+K_1+K_{offset1}$$

In another aspect, the UE can utilize the new $K_{offset}$ (e.g., $K_{offset2}$) to transmit UL transmission 925. For example, the UE can calculate the actual uplink time slot for transmitting a HARQ ACK as $N1'+K_1+K_{offset2}$. In some examples, the value of $K_{offset2}$ can be greater or lesser than the value of $K_{offset1}$, and an actual uplink time slot calculated based on $K_{offset1}$ may be earlier or later than the virtual uplink time slot N5 that is calculated based on $K_{offset1}$. In this example, a UE can determine the actual uplink time slot to use for UL transmission 925 as:

$$\text{uplink time slot}=N1'+K_1+K_{offset2}$$

In another aspect, the UE can determine the actual uplink time slot for transmitting UL transmission 925 based on the network timing offset parameter $K_1$. For example, the UE can use the $K_{offset}$ value that was active at the uplink time slot $N1'+K_1$ when determining the actual uplink time slot for UL transmission 925. In the example of FIG. 9, the uplink time slot $N1'+K_1$ is shown as the uplink time slot 921, which occurs before either the $K_{offset}$ update command 914 or the $K_{offset}$ update activation time 924. The old $K_{offset}$ value, $K_{offset1}$, is the active $K_{offset}$ at uplink time slot 921, and the UE can calculate the actual uplink time slot for UL transmission 925 based on $K_{offset1}$. If the uplink time slot $N1'+K_1$ were instead to have occurred after (e.g., to the right) of $K_{offset}$ update activation time 924, then the UE may calculate the actual uplink time slot for UL transmission 925 based on $K_{offset1}$. In this example, a UE can determine the actual uplink time slot to use for UL transmission 925 as:

$$\text{uplink time slot}=N1'+K_1+K_{offset}(N1'K_1)$$

Here, $K_{offset}$(N1' $K_1$) represents the $K_{offset}$ value (e.g., either $K_{offset1}$ or $K_{offset2}$) at time $N1'+K_1$.

In another aspect, in response to determining that the $K_{offset}$ update 924 time slot N4 occurs between the uplink time slot N1' and the virtual uplink time slot N5 (e.g., N1'

<N4<N5), the UE can use a cell-specific $K_{offset}$ to calculate or determine the actual uplink time slot for UL transmission 925. For example, a cell-specific $K_{offset}$, $K_{offset}$ cell specific, may be known to both the UE (e.g., which is transmitting UL transmission 925) and the NTN node or base station (e.g., which is expecting UL transmission 925 in response to the NTN node's DL transmission 912). In this example, the UE can determine the actual uplink time slot as:

$$\text{uplink time slot}=N1'+K_1+K_{offset\_cell\_specific}$$

In some examples, $K_{offset}$ update command 914 can include an SIB or an RRC to update a cell-specific $K_{offset}$. $K_{offset}$ update command 914 can include a MAC CE, an RRC, or a DCI to update a UE-specific $K_{offset}$. As mentioned previously, the activation time of a MAC CE can be 3 ms after the UE transmits a HARQ ACK acknowledging the MAC CE command (e.g., when $K_{offset}$ update command 914 is a MAC CE, the $K_{offset}$ update activation time 924 can be 3 ms after the HARQ ACK 923). In some examples, when the $K_{offset}$ update command 914 includes an SIB, the application time of the SIB (e.g., the $K_{offset}$ update activation time 924) may be at or after then end of the System Information (SI) modification period during which the UE acquired the SIB of $K_{offset}$ update command 914. In another example, when the $K_{offset}$ update command 914 includes an RRC command, the application time of the RRC command (e.g., RRCReconfiguration) may be a time within the procedure delay from the reception of the RRC command. In another example, when the $K_{offset}$ update command 914 includes a DCI, the application time of the DCI (e.g., the $K_{offset}$ update activation time 924) may be in the same slot in which the DCI is received (e.g., the same as the slot N2 in which the $K_{offset}$ update command was received).

In one illustrative example, UL transmission 925 can include a HARQ ACK that will be included in a HARQ codebook. As described previously, a HARQ codebook can include a plurality of individual or different HARQ ACKs. In some aspects, UL transmission 925 can include a HARQ ACK that will be included in a type-1 (e.g., semistatic) HARQ codebook or in a type-2 (e.g., dynamic) HARQ codebook. In some examples, UL transmission 925 can include a CSI report and/or an aperiodic SRS instead of a HARQ ACK.

In some aspects, the UE can determine an uplink time slot for UL transmission 925 based on the time slot in which $K_{offset}$ update command 914 was received (e.g., time slot N2), rather than based on the time slot in which the $K_{offset}$ update was activated (e.g., rather than $K_{offset}$ update activation 924 at uplink time slot N4). For example, the above description was made with reference to an example in which the UE calculates a transmission timing for UL transmission 925 in response to determining that the $K_{offset}$ update 924 time slot N4 occurs between the uplink time slot N1' and the virtual uplink time slot N5 (e.g., N1'<N4<N5). In one illustrative example, the UE can calculate a transmission timing for UL transmission 925, using some or all of the approaches described above, in response to determining that the $K_{offset}$ update command 924 was received in a time slot (e.g., N2) that occurs between the uplink time slot N1' and the virtual uplink time slot N5 (e.g., N1'<N2<N5).

In another illustrative example, a UE can calculate a transmission timing for UL transmission 925 by analyzing one or more of the DL transmission time reception on the uplink side 920 (e.g., N1'), the $K_{offset}$ update activation time 924, and/or the calculated virtual uplink time slot (e.g., N5) in order to select between the old $K_{offset1}$ and the updated $K_{offset2}$. In some cases, a UE can select between the old $K_{offset1}$ and the updated $K_{offset2}$ and apply the selected $K_{offset}$ to HARQ codebook constructions and/or the UL transmission 925.

In some aspects, the UE can select between the old $K_{offset1}$ and the updated $K_{offset2}$ based on comparing the time when DL transmission 912 was received (e.g., uplink time slot N1') with the $K_{offset}$ update activation time 924 (e.g., uplink time slot N4). For example, in response to determining that N1' is earlier than N4, the UE can select the old $K_{offset1}$ and calculate the transmission timing for UL transmission 925 as the actual uplink time slot $N1'+K_1+K_{offset1}$. In response to determining that N1' is not earlier than N4 (e.g., N1' is later than N4), the UE can select and use the updated $K_{offset2}$ for calculating the transmission timing for UL transmission 925, using the actual uplink time slot $N1'+K_1+K_{offset2}$.

In another aspect, the UE can select between the old $K_{offset1}$ and the updated $K_{offset2}$ based on comparing the virtual uplink time slot N5 calculated for the UL transmission 925 with the $K_{offset}$ update activation time 924 (e.g., uplink time slot N4). For example, in response to determining that the virtual uplink time slot N5 is later than the $K_{offset}$ activation time slot N4, the UE can select and use the updated $K_{offset2}$ for calculating the transmission timing for UL transmission 925, using the actual uplink time slot $N1'+K_1+K_{offset2}$. In response to determining that the virtual uplink time slot N5 is not later than the $K_{offset}$ update activation time slot N4, the UE can select and use the old $K_{offset1}$ for calculating the transmission timing for UL transmission 925, using the actual uplink time slot $N1'+K_1+K_{offset1}$.

In another example, in response to determining that the virtual uplink time slot N5 is later than the $K_{offset}$ update activation time slot N4, the UE can select and use the cell-specific $K_{offset}$ (e.g., $K_{offset\_cell\_specific}$) to calculate the actual uplink time slot for UL transmission 925 as $N1'+K_1+K_{offset\_cell\_specific}$ In response to determining that the virtual uplink time slot N5 is not later than the $K_{offset}$ update activation time slot N4, the UE can select and use an old $K_{offset}$ value to calculate the actual uplink time slot for UL transmission 925. For example, the old $K_{offset}$ value may be a UE-specific $K_{offset}$ or an old cell-specific $K_{offset}$ (e.g., if the UE does not know or have access to a UE-specific $K_{offset}$).

In another aspect, the UE can select between the old $K_{offset1}$ and the updated $K_{offset2}$ based on comparing a hypothetical uplink transmission time determined using the network timing offset parameter $K_1$ without any $K_{offset}$ (e.g., the hypothetical uplink transmission time given as $N1'+K_1$) with the $K_{offset}$ update activation time slot N4. In response to determining that the hypothetical uplink transmission time $N1'+K_1$ is earlier than the $K_{offset}$ update activation time slot N4, the UE can select and use the old $K_{offset1}$ to calculate the actual uplink time slot for UL transmission 925 as the uplink time slot $N1'+K_1+K_{offset1}$. In response to determining that the hypothetical uplink transmission time $N1'+K_1$ is not earlier than the $K_{offset}$ update activation time slot N4, the UE can select and use the updated $K_{offset2}$ to calculate the actual uplink time slot for UL transmission 925 as the uplink time slot $N1'+K_1+K_{offset2}$.

In some examples, the UE can select between $K_{offset1}$ and $K_{offset2}$ based on comparisons against the reception time of the $K_{offset}$ update command 914 (e.g., N2), rather than using the $K_{offset}$ update activation time slot N4 as was described above.

In one illustrative example, a UE can select and determine a $K_{offset}$ value to apply to HARQ codebook construction and/or UL transmission 925 based on determining the latest (e.g., currently active) $K_{offset}$ value at a calculated uplink time slot. For example, the UE can determine which $K_{offset}$ value (e.g., $K_{offset1}$ or $K_{offset2}$) was the latest or currently active $K_{offset}$ at the time the DL transmission 912 was received (e.g., the UE can use the latest/active $K_{offset}$ value at uplink time slot N1'). The $K_{offset}$ selected by the UE can be a cell-specific $K_{offset}$ or can be a UE-specific $K_{offset}$.

In another illustrative example, a UE can select or determine a $K_{offset}$ value to apply based on determining which $K_{offset}$ value (e.g., $K_{offset1}$ or $K_{offset2}$) is the latest/active $K_{offset}$ at the originally schedule uplink time slot for UL transmission 925. For example, the UE can select and utilize whichever one of $K_{offset1}$ and $K_{offset2}$ is the active $K_{offset}$ at the time of the calculated virtual uplink time slot N5. The $K_{offset}$ selected by the UE can be a cell-specific $K_{offset}$ or can be a UE-specific $K_{offset}$.

In another illustrative example, a UE can select or determine a $K_{offset}$ value to apply based on determining the latest or the active $K_{offset}$ at the hypothetical UL transmission time described above (e.g., the latest/active $K_{offset}$ at uplink time slot N1'+$K_1$).

Figures 11, 12:
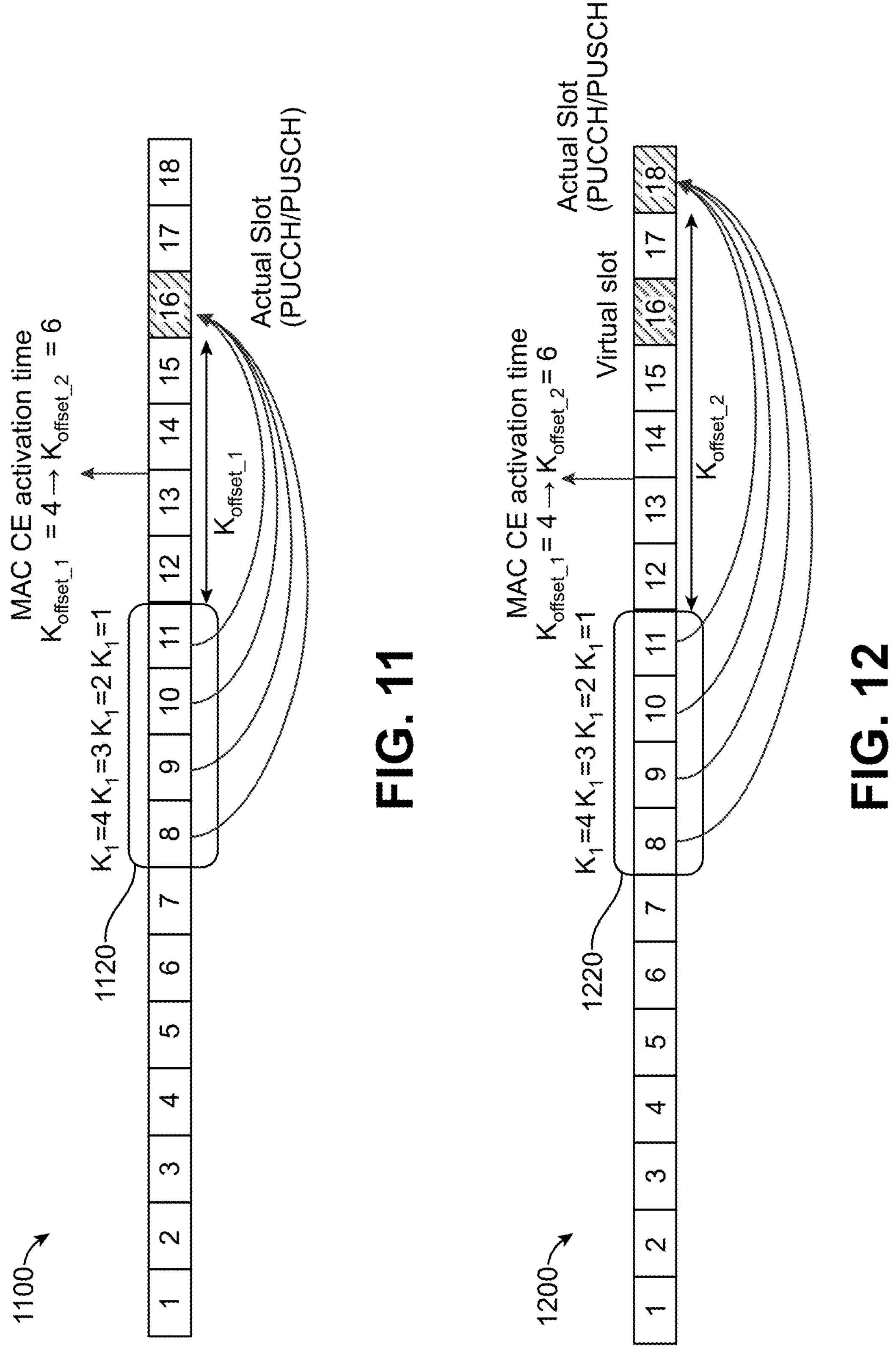
FIG. 11 is a diagram illustrating an example Hybrid Automatic Repeat Request (HARQ) codebook construction, in accordance with some examples.
FIG. 12 is a diagram illustrating another example HARQ codebook construction, in accordance with some examples.

FIGS. 11, 12, 13A, and 13B are example diagrams of HARQ codebook construction, according to aspects of the present disclosure. For example, FIG. 11 depicts an example diagram 1100 for HARQ codebook construction using the old $K_{offset1}$ as the scheduling offset. A plurality of uplink time slots 1-18 are depicted. A plurality of uplink time slots 1120 can be utilized to construct a HARQ codebook. For example, a UE may receive a DL transmission corresponding to each of the uplink time slots 8, 9, 10, and 11 that are included in the plurality of uplink time slots 1120 of the HARQ codebook. The DL transmission can be the same as or similar to the DL transmission 925 and/or any of the DL transmission described above.

A HARQ codebook can be generated or constructed from the plurality of uplink time slots 1120 by generating a HARQ ACK for the DL transmission associated with each of the individual uplink time slots 8, 9, 10, and 11. The four individual HARQ ACKs can then be combined into a single HARQ codebook which is transmitted in a single uplink time slot. For example, the four individual HARQ ACKs can be transmitted as a single HARQ codebook using the uplink time slot 16 as the actual slot for uplink transmission. In some aspects, the uplink transmission associated with or including the HARQ codebook can be a PUCCH or a PUSCH transmission.

The UE can determine aligned transmission timing for the HARQ ACKs generated in uplink time slots 8-11 by using the networking timing offset (e.g., $K_1$) value uniquely associated with each of the uplink time slots and the scheduling offset (e.g., $K_{offset1}$) value shared across the uplink time slots 8-11. For example, the first uplink time slot 8 can have a transmission timing compensation of $K_1+K_{offset1}=4+4=8$ uplink time slots; the second uplink time slot 9 can have a transmission timing compensation of $K_1+K_{offset1}=3+4=7$ uplink time slots; etc. Based on the different $K_1$ values and the $K_{offset1}$ value, the HARQ ACKs associated with uplink time slots 8-11 are transmitted using transmission timing compensations that cause each HARQ ACK to be transmitted during the same actual uplink time slot (e.g., uplink time slot 16).

In some examples, a $K_{offset}$ update activation time (e.g., such as $K_{offset}$ update activation time 924 illustrated in FIG. 9) may occur in an uplink time slot that is after the last uplink time slot from which the HARQ codebook is being constructed but before the uplink time slot in which the HARQ codebook will be transmitted. For example, a $K_{offset}$ update activation (shown here as a MAC CE activation time) can occur at uplink time slot 14, which is after uplink time slot 11 (e.g., the last uplink time slot used in the HARQ codebook construction) but before uplink time slot 16 (e.g., the scheduled uplink time slot for transmitting the HARQ codebook).

In one illustrative example, if the UE were to continue using the old $K_{offset1}$ value to transmit the HARQ codebook at uplink time slot 16 (e.g., after an updated $K_{offset2}$ value became active at uplink time slot 14), a non-causal situation may occur. The non-causal situation may occur because the actual PUCCH or PUSCH uplink transmission slot is earlier than a MAC CE activation time for updating the $K_{offset}$ and/or may occur if the old $K_{offset1}$ is shorter than the new UE-to-gNB RTT/RTD that triggered the $K_{offset}$ update to provide a larger $K_{offset2}$ value. For example, if $K_{offset2}$ is sufficiently larger than $K_{offset1}$ (e.g., because the RTT/RTD increased by a relatively large amount), a non-causal situation may occur if the UE transmits the HARQ codebook using the old $K_{offset1}$ value. By transmitting the HARQ codebook using $K_{offset1}$, the UE's transmission is made under an assumption that the RTT/RTD between the UE and an NTN node (e.g., gNB) is significantly shorter than the actual RTT/RTD, and a non-causal situation may therefore result (e.g., because the HARQ codebook will actually take the RTT/RTD associated with the updated $K_{offset2}$ before reaching the gNB). In one example, such an occurrence can be treated as an error case. In some examples, the UE can recognize that an updated $K_{offset2}$ has been activated prior to the scheduled UL transmission of the HARQ codebook using $K_{offset1}$—in response to determining that the updated $K_{offset2}$ is sufficiently larger relative to the old $K_{offset1}$, the UE can instead transmit the HARQ codebook at a different scheduled uplink time slot determined using $K_{offset2}$.

In another illustrative example, a UE can use an updated $K_{offset2}$ to determine an actual PUCCH or PUSCH uplink time slot for HARQ codebook construction (e.g., for an UL transmission that includes the HARQ codebook generated for uplink time slots 8-11). For example, as illustrated in the diagram 1200 FIG. 12, the virtual uplink time slot (e.g., N5) generated using the old $K_{offset1}=4$ value is uplink time slot 16. Using the updated $K_{offset2}=6$ value, the UE instead calculates the actual uplink time slot for HARQ codebook transmission as uplink time slot 18.

In some cases, using the updated $K_{offset2}$ value can lead to a non-causal situation (e.g., actual PUCCH/PUSCH slot is earlier than MAC CE activation time; e.g., if the updated $K_{offset2}$ is significantly shorter than the old $K_{offset1}$). For example, if the updated $K_{offset2}$ is significantly shorter than the old $K_{offset1}$, the new uplink transmission time that would be calculated using $K_{offset2}$ can occur prior to the activation time of $K_{offset2}$. For example, in the context of FIG. 12, an updated $K_{offset2}$ value equal to 1 would result in the UE transmitting the HARQ codebook at uplink time slot 13. Because uplink time slot 13 occurs before $K_{offset2}=1$ would become active, the gNB or NTN base station receiving the HARQ codebook transmitted at uplink time slot 13 would not be able to associate the received HARQ codebook to the HARQ ACKs that the UE generated for the uplink time slots 8-11, and a non-causal situation would result. In one illustrative example, the UE and/or the gNB/NTN base station can treat this non-causal situation as an error case. In another illustrative example, the UE can recognize that using the updated $K_{offset2}$ value would cause the HARQ codebook to be transmitted in an uplink time slot that is before the activation time of $K_{offset2}$, and in response, the UE can instead transmit the HARQ codebook using the old $K_{offset1}$ value and avoid the non-causal situation or error case treatment that may otherwise occur.

Figures 13A, 13B:
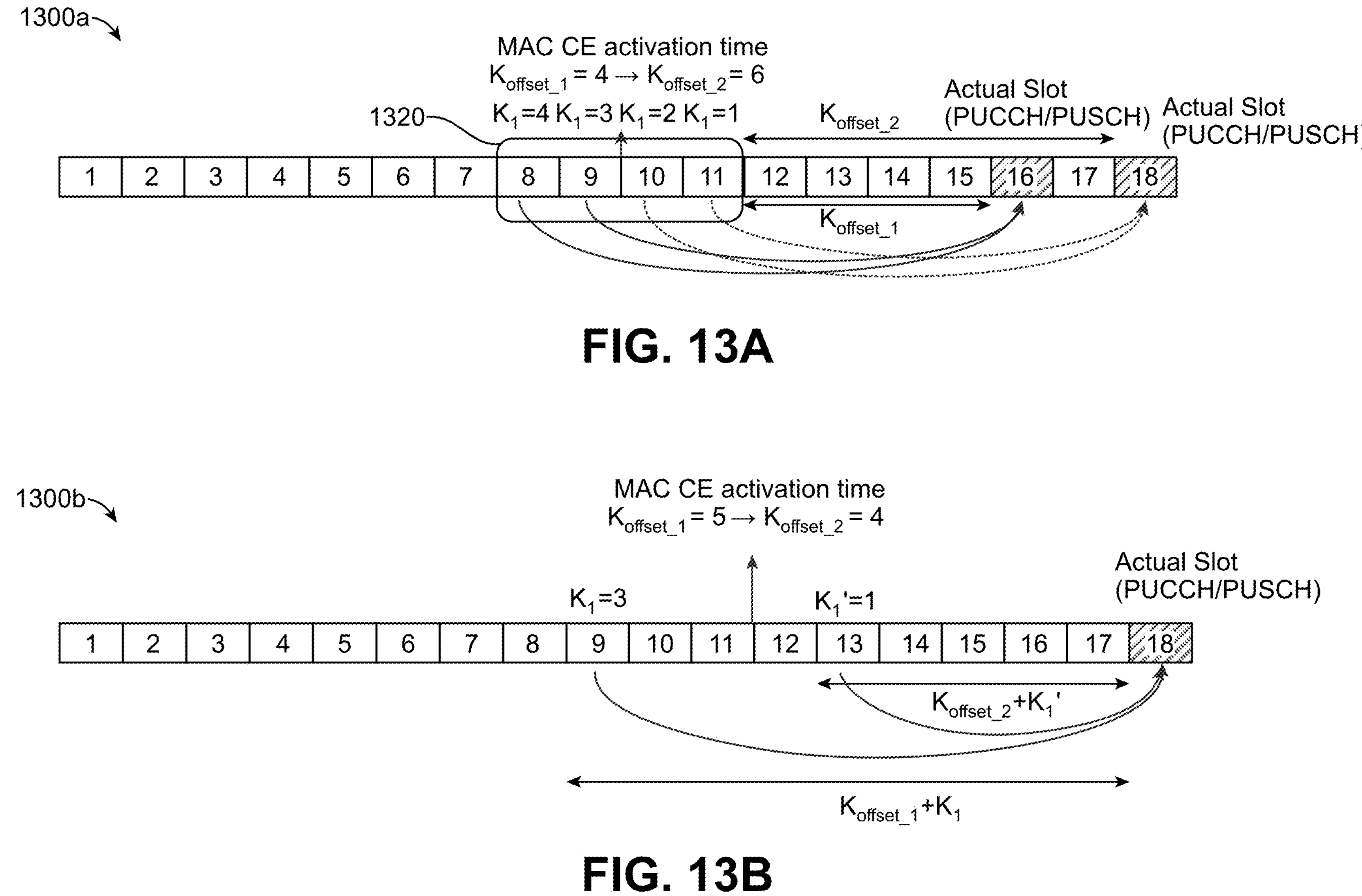
FIG. 13A is a diagram illustrating another example HARQ codebook construction, in accordance with some examples.
FIG. 13B is a diagram illustrating another example HARQ codebook construction, in accordance with some examples.

FIGS. 13A and 13B are diagrams illustrating examples of additional HARQ codebook construction processes. For example, FIG. 13A is a diagram 1300*a* illustrating a scenario in which a single block of HARQ ACK bits (e.g., the block 1320 of HARQ ACK bits generated for uplink time slots 8-11) is split into two separate HARQ codebook transmissions. As illustrated, a $K_{offset}$ update activation time (e.g., MAC CE activation time) can occur at an uplink time slot that falls within the single block 1320 of HARQ bits. The uplink time slots that are before the $K_{offset}$ update activation time (e.g., uplink time slots 8 and 9) can be transmitted in a first HARQ codebook that is transmitted at an uplink time slot determined using the old $K_{offset1}=4$ (e.g., at the actual PUCCH/PUSCH uplink time slot 16). The uplink time slots that are after the $K_{offset}$ update activation time (e.g., uplink time slots 10 and 11) can be transmitted in a second HARQ codebook that is transmitted at an uplink time slot determined using the updated $K_{offset2}=6$ (e.g., at the actual PUCCH/PUSCH uplink time slot 18).

In another illustrative example, HARQ ACK bits that are determined for uplink time slots that are separated in time (e.g., non-contiguous) may be combined into a single HARQ codebook. For example, FIG. 13B is a diagram, 1300*b* illustrating a scenario in which a $K_{offset}$ update activation time occurs at uplink time slot 12, which is between a first HARQ ACK bit generated for uplink time slot 9 and a second HARQ ACK bit generated for uplink time slot 13. The single, combined HARQ codebook can be generated by using the old $K_{offset1}$ value to determine a transmission timing for the HARQ ACK bit generated before the $K_{offset}$ update activation (e.g., using $K_{offset1}$ to determine the transmission timing for the HARQ ACK bit at uplink time slot 9) and using the updated $K_{offset2}$ value to determine a transmission timing for the HARQ ACK bit generated after the $K_{offset}$ update activation (e.g., using $K_{offset2}$ to determine the transmission timing for the HARQ ACK bit at uplink time slot 13). In order to align the HARQ ACK bit associated with uplink time slot 9 and the HARQ ACK bit associated with uplink time slot 13, different $K_1$ values can be utilized. For example, the transmission timing for the HARQ ACK bit associated with uplink time slot 9 can be determined as $K_{offset1}+K_1=5+3=8$, such that the HARQ ACK bit associated with uplink time slot 9 is transmitted in the uplink time slot 18. The transmission timing for the HARQ ACK bit associated with uplink time slot 13 can be determined as $K_{offset2}$ $K_1'=4+1=5$, such that the HARQ ACK bit associated with uplink time slot 13 is also transmitted in the uplink time slot 18.

As noted above, a UE specific $K_{offset}$ can be updated by MAC CE. In some examples, an application time for a UE specific $K_{offset}$ (e.g., $K_{UE,offset}$) can be determined as follows: if the UE is provided a $K_{UE,offset}$ value by a MAC CE command, the UE can apply the MAC command in the first slot that is after slot $$k+3N_{slot}^{subframe,\mu}.$$

The first slot that is after slot $$k+3N_{slot}^{subframe,\mu}$$

can also be referred to as the application time (e.g., for the UE specific $K_{offset}$ associated with the MAC CE command). Here, k represents the slot where the UE would transmit a PUCCH with HARQ-ACK information for the PDSCH providing the MAC CE command, and μ represents the SCS configuration for the PUCCH transmission that is determined in the slot when the MAC CE command is applied (e.g., the first slot that is after the slot associated with the application time $$k+3N_{slot}^{subframe,\mu}).$$

Figures 14A, 14B:
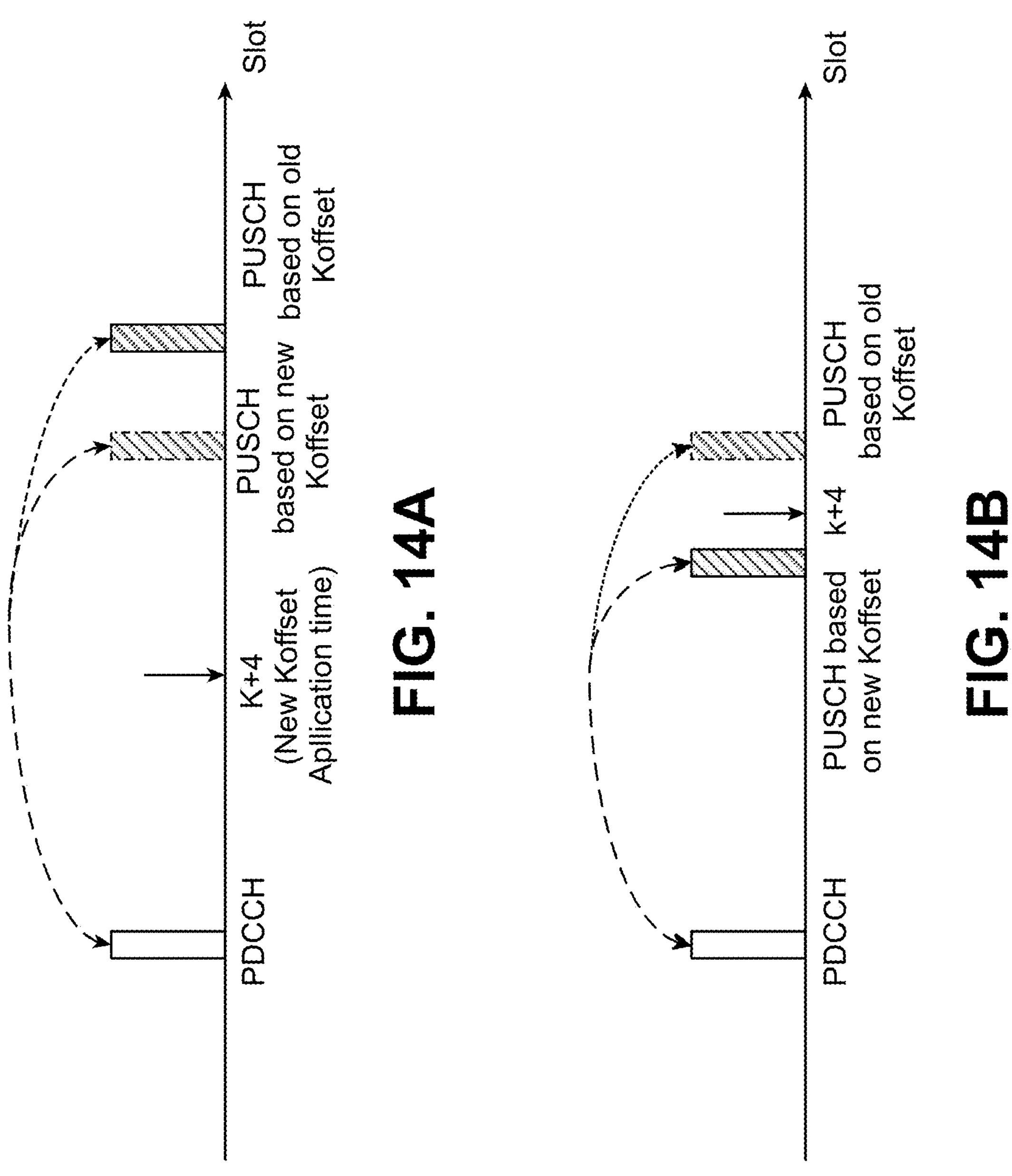
FIG. 14A and FIG. 14B are diagrams illustrating examples where application of new or old $K_{offset}$ is undefined, in accordance with some examples.

In some cases, it may be unclear if the new $K_{offset}$ value (e.g., the updated $K_{offset}$ value determined from the MAC CE command) or the old $K_{offset}$ value (e.g., the $K_{offset}$ value associated with the UE prior to receiving or applying the MAC CE command) is to be used. For instance, it may be unclear which $K_{offset}$ value is to be utilized by a UE that receives a scheduling PDCCH (e.g., that schedules an uplink transmission) before the application time, $$k+3N_{slot}^{subframe,\mu}+1,$$

but determines a scheduled PUCCH/PUSCH that is to be transmitted after the application time, as depicted in FIG. 14A and FIG. 14B.

In the example of FIG. 14A, the UE receives PDCCH that schedules an uplink transmission prior to the application time of a new $K_{offset}$ value (e.g., depicted in FIG. 14A as K+4). As illustrated, it is not clear whether the UE should schedule a PUCCH/PUSCH based on the old $K_{offset}$ value, or a PUCCH/PUSCH based on the new $K_{offset}$ value, for a transmission after the new $K_{offset}$ application time. In the example of FIG. 14B, the UE receives a scheduling PDCCH for an uplink transmission, and it is unclear whether the UE should schedule a PUCCH/PUSCH based on the new $K_{offset}$ value (that would occur prior to the new $K_{offset}$ application time, K+4) or schedule a PUCCH/PUSCH based on the old $K_{offset}$ value that would be scheduled for transmission after the new $K_{offset}$ application time.

As described above, the transmit time of PUCCH and PUSCH can depend on the $K_{offset}$ value. One or more ambiguities between the use of an old $K_{offset}$ value and the use of a new or updated $K_{offset}$ value (e.g., by a UE receiving a MAC CE that updates the $K_{offset}$ value) may exist in at least the following cases: the transmission timing of DCI scheduled PUSCH (e.g., including CSI on PUSCH); the transmission timing of HARQ-ACK on PUCCH (e.g., including PUCCH in response to MsgB); and the transmission timing of aperiodic SRS.

In one illustrative example, ambiguities between the use of old $K_{offset}$ values and new $K_{offset}$ values can be addressed based on the use of a reference time. For example, a reference time can be determined (e.g., by the UE receiving the scheduling PDCCH) and compared with the application time of a new or updated $K_{offset}$. For instance, a UE can determine a reference time and compare the reference time to the application time $$k+3N_{slot}^{subframe,\mu}+1.$$

As described herein, the reference time can be determined based on the PDCCH that schedules the corresponding uplink transmission (e.g., the reference time can be the time at which a scheduling PDCCH is received by a UE), a virtual transmission time of the uplink transmissions, or other reference time(s). In one illustrative example, for DCI scheduled PUSCH including CSI on PUSCH and aperiodic SRS and for HARQ-ACK on PUCCH, the $K_{offset}$ that is valid at the time of the associated DCI is applied. For instance, for DCI scheduled PUSCH (e.g., including CSI on PUSCH, aperiodic SRS), the $K_{offset}$ value that is valid at the time of the associated DCI can be applied. For example, if the old $K_{offset}$ value is valid at the time a DCI that schedules the PUSCH is applied by a UE, the UE uses the old $K_{offset}$ value and not the new $K_{offset}$ value. If the new $K_{offset}$ value (e.g., indicated by a MAC CE) is valid at the time the DCI that schedules the PUSCH is applied by the UE, the UE uses the new $K_{offset}$ value and not the old $K_{offset}$ value.

Figure 15:
FIG. 15 is a flow diagram illustrating an example of a process implemented by an aircraft UE for performing mobile handovers, in accordance with some examples.
Figure 15:
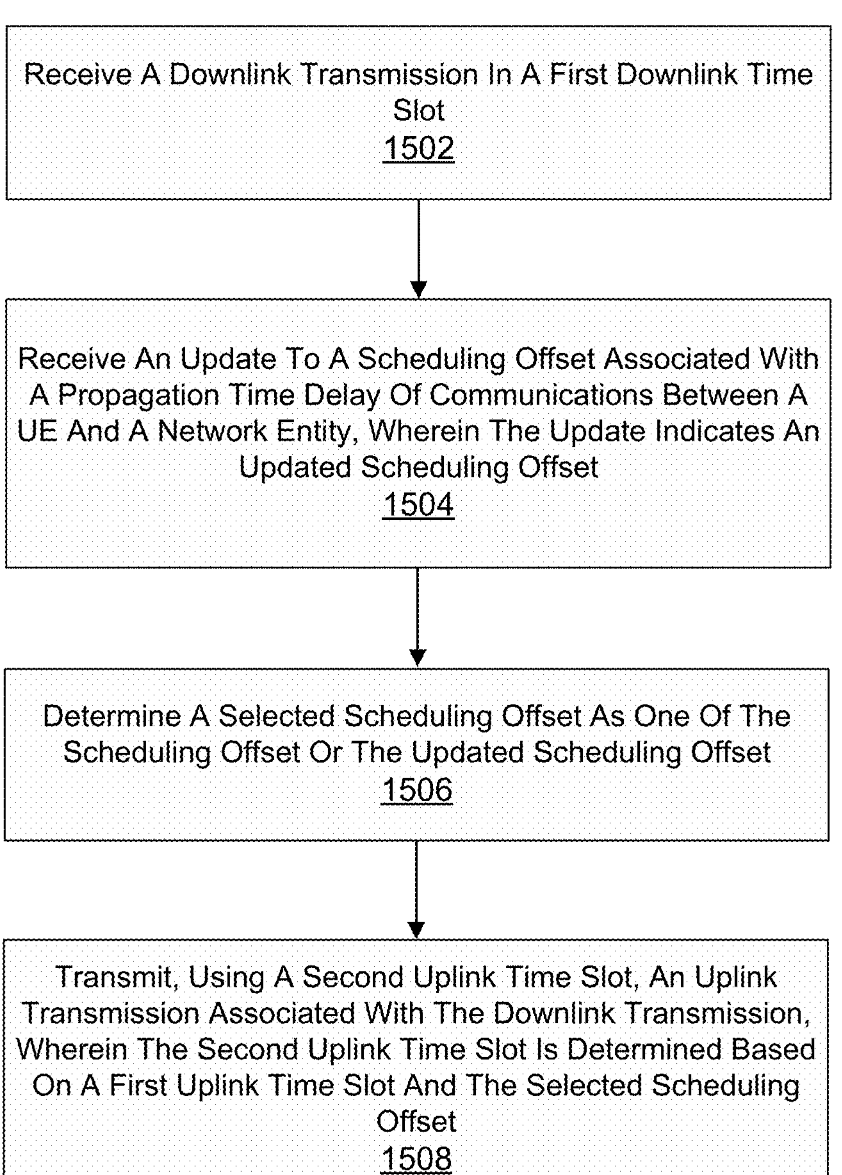

FIG. 15 is a flowchart illustrating an example of a process 1500 for wireless communications using one or more techniques described herein (e.g., for performing uplink transmission timing based on receiving one or more scheduling updates). The process 1500 can be performed by a computing device or apparatus, such as a wireless communications device (e.g., a UE), or a component or system (e.g., a chipset) of the wireless communication device. The operations of the process 1500 may be implemented as software components that are executed and run on one or more processors (e.g., processor(s) 484 of FIG. 4, processor 1610 of FIG. 16, or other processor(s)). Further, the transmission and reception of signals by the wireless communications device in the process 1500 may be enabled, for example, by one or more antennas (e.g., antenna 487 of FIG. 4) and/or one or more transceivers (e.g., wireless transceiver(s) 478 of FIG. 4).

At block 1502, the wireless communications device (or component thereof) may receive a downlink transmission in a first downlink time slot. For example, the downlink transmission can be the same as or similar to the downlink communication 710 illustrated in FIG. 7. In some cases, the downlink transmission can be a Physical Downlink Shared Channel (PDSCH) transmission carrying Downlink Shared Channel (DL-SCH) data. In some examples, the first downlink time slot can be the same as or similar to the downlink time slot n of FIG. 7. In another example, the downlink transmission can be the same as or similar to the downlink transmission 912 illustrated in FIG. 9 and the downlink time slot can be the same as or similar to the downlink time slot N1 of FIG. 9. In some cases, the downlink transmission can include or be scheduled by one or more of a Physical Downlink Control Channel (PDCCH) transmission, a PDCCH+$K_0$ transmission, a PDSCH transmission (e.g., such as PDSCH 710 illustrated in FIG. 7), a Channel State Information (CSI) request, and/or an aperiodic Sounding Reference Signal (SRS), etc. In some examples, the downlink transmission can include or be scheduled by one or more of: a PDSCH candidate reception, a PDSCH reception, a Semi-Persistent Scheduling (SPS) release, a Transmission Configuration Indicator (TCI) update, a PDCCH that requires a HARQ ACK, a PDCCH that schedules a PDSCH, a PDCCH determined by a PDCCH monitoring occasion, etc. In some cases, the PDCCH transmission schedules a PUSCH transmission. In some examples, the PDCCH transmission provides information about a PDSCH. In some cases, the downlink transmission is a Physical Downlink Control Channel (PDCCH) transmission including Downlink Control Information (DCI).

At block 1504, the wireless communications device (or component thereof) may receive an update to a scheduling offset (e.g., $K_{offset1}$) associated with a propagation time delay of communications between the UE and a network entity. The update indicates an updated scheduling offset (e.g., $K_{offset2}$) In some examples, the updated scheduling offset can be different than the scheduling offset. The network entity may include a base station (e.g., a gNB or eNB), a portion of a base station (e.g., a central unit (CU), a distributed unit (DU), a radio unit (RU), a Near-Real Time (Near-RT) RAN Intelligent Controller (RIC), or a Non-Real Time (Non-RT) RIC of a base station having a decentralized architecture), a Non-Terrestrial Network (NTN) entity, or other network entity.

At block 1506, the wireless communications device (or component thereof) may determine a selected scheduling offset as one of the scheduling offset or the updated scheduling offset. The updated scheduling offset can be different than the scheduling offset. At block 1508, the wireless communications device (or component thereof) may transmit, using a second uplink time slot, an uplink transmission associated with the downlink transmission. For instance, the second uplink time slot may be determined based on a first uplink time slot (e.g., uplink time slot N1' of FIG. 9) and the selected scheduling offset. In some aspects, the uplink transmission includes feedback associated with the downlink transmission. In some examples, the feedback is Hybrid Automatic Repeat Request (HARQ) feedback including an acknowledgement or a negative acknowledgement. In some cases, the HARQ feedback is included in a HARQ codebook. The HARQ codebook may include two or more instances of HARQ feedback. In some aspects, the downlink transmission includes a CSI request. In such aspects, the uplink transmission may include a Channel State Information (CSI) report. In some aspects, the uplink transmission includes an aperiodic Sounding Reference Signal (SRS). In such aspects, the downlink transmission may include an aperiodic SRS command. In some aspects, the uplink transmission is transmitted using Physical Uplink Shared Channel (PUSCH). In some cases, the PUSCH is scheduled by the downlink transmission, which may include or be scheduled by a Physical Downlink Control Channel (PDCCH).

In some aspects, the selected scheduling offset is a cell-specific scheduling offset. In some cases, the second uplink time slot is a sum of the first uplink time slot (e.g., uplink time slot N1' of FIG. 9), the cell-specific scheduling offset (e.g., cell-specific $K_{offset1}$ or $K_{offset2}$), and a network timing offset (e.g., $K_1$ of FIG. 9).

In some aspects, the first uplink time slot overlaps with at least a portion of the first downlink time slot. For instance, the uplink time slot may be determined as follows:

$$N1' = \left\lfloor 2^{\frac{\mu_{UL}}{\mu_{DL}}}(N1+1)-1 \right\rfloor$$

In some aspects, the wireless communications device (or component thereof) may determine a third uplink time slot (e.g., N4 of FIG. 9) associated with the updated scheduling offset. The third uplink time slot includes an indication of at least one of an activation time of the updated scheduling offset or a reception time of the updated scheduling offset.

In some aspects, the wireless communications device (or component thereof) may determine a virtual uplink time slot based on the first uplink time slot, the scheduling offset, and a network timing offset. In one illustrative example, the virtual uplink time slot may be determined as N5=N1'+$K_1$+

$K_{offset1}$, where N5 is an example of the virtual uplink time slot, N1' is an example of the first uplink time slot, $K_1$ is an example of the network timing offset, and $K_{offset1}$ is an example of the scheduling offset.

In some examples, the wireless communications device (or component thereof) may select the scheduling offset (e.g., $K_{offset1}$) as the selected scheduling offset based on a determination that the third uplink time slot associated with the updated scheduling offset is later than the first uplink time slot and earlier than the virtual uplink time slot. In some such examples, the second uplink time slot and the virtual uplink time slot may be the same (e.g., virtual slot N5 becomes the actual uplink slot for transmission when $K_{offset1}$ is used).

In some examples, the wireless communications device (or component thereof) may select the updated scheduling offset (e.g., $K_{offset2}$) as the selected scheduling offset based on a determination that the third uplink time slot associated with the updated scheduling offset is later than the first uplink time slot and earlier than the virtual uplink time slot. In some such examples, the second uplink time slot may be a sum of the first uplink time slot, the updated scheduling offset, and the network timing offset. For instance, when updated $K_{offset2}$ is selected, the uplink slot=N1'+$K_1$+$K_{offset2}$, where N1' is an example of the first uplink time slot and $K_1$ is an example of the network timing offset.

In some examples, the wireless communications device (or component thereof) may select the updated scheduling offset (e.g., $K_{offset2}$) as the selected scheduling offset based on a determination that the virtual uplink time slot (e.g., N5 of FIG. 9) is later than the third uplink time slot (e.g., N4 of FIG. 9) associated with the updated scheduling offset.

In some examples, the wireless communications device (or component thereof) may select the scheduling offset (e.g., $K_{offset1}$) as the selected scheduling offset based on a determination that the virtual uplink time slot (e.g., N5 of FIG. 9) is not later than (or is less than) the third uplink time slot (e.g., N4 of FIG. 9) associated with the updated scheduling offset.

In some examples, the wireless communications device (or component thereof) may select the scheduling offset (e.g., $K_{offset1}$) or the updated scheduling offset (e.g., $K_{offset2}$) as the selected scheduling offset based on whether the scheduling offset or the updated scheduling offset is currently active at the virtual uplink time slot (e.g., N5 of FIG. 9).

In some aspects, the wireless communications device (or component thereof) may select the scheduling offset (e.g., $K_{offset1}$) as the selected scheduling offset based on a determination that the first uplink time slot (e.g., N1' of FIG. 9) is earlier than the third uplink time slot (e.g., N4 of FIG. 9) associated with the updated scheduling offset.

In some cases, the wireless communications device (or component thereof) may select the updated scheduling offset (e.g., $K_{offset2}$) as the selected scheduling offset based on a determination that the first uplink time slot (e.g., N1' of FIG. 9) is later than the third uplink time slot (e.g., N4 of FIG. 9) associated with the updated scheduling offset.

In some examples, the wireless communications device (or component thereof) may select the scheduling offset (e.g., $K_{offset1}$) as the selected scheduling offset based on a determination that an uplink time slot (e.g., uplink time slot 921 of FIG. 9) determined as a sum of the first uplink time slot (e.g., N1' of FIG. 9) and a network timing offset (e.g., $K_1$ of FIG. 9) is earlier than the third uplink time slot (e.g., N4 of FIG. 9) associated with the updated scheduling offset.

In some aspects, the wireless communications device (or component thereof) may select the updated scheduling offset (e.g., $K_{offset2}$) as the selected scheduling offset based on a determination that the uplink time slot (e.g., uplink time slot 921 of FIG. 9) determined as a sum of the first uplink time slot (e.g., N1' of FIG. 9) and the network timing offset (e.g., $K_1$ of FIG. 9) is later than the third uplink time slot (e.g., N4 of FIG. 9) associated with the updated scheduling offset.

In some cases, the wireless communications device (or component thereof) may select the scheduling offset (e.g., $K_{offset1}$) or the updated scheduling offset (e.g., $K_{offset2}$) as the selected scheduling offset based on whether the scheduling offset or the updated scheduling offset is currently active at the uplink time slot (e.g., uplink time slot 921 of FIG. 9) determined as a sum of the first uplink time slot (e.g., N1' of FIG. 9) and the network timing offset (e.g., $K_1$ of FIG. 9). In some such cases, the second uplink time slot is a sum of the first uplink time slot, the scheduling offset or the updated scheduling offset, and the network timing offset.

In some aspects, the wireless communications device (or component thereof) may select the scheduling offset (e.g., $K_{offset1}$) or the updated scheduling offset (e.g., $K_{offset2}$) as the selected scheduling offset based on whether the scheduling offset or the updated scheduling offset is currently active when the downlink transmission is received.

In some examples, the processes described herein (e.g., process 1500 and/or other process described herein) may be performed by a computing device or apparatus (e.g., a UE, a network entity, etc.). In one example, the process 1500 may be performed by a wireless communication device, such as a UE (e.g., the wireless device 407 of FIG. 4, the UE 505 of FIGS. 5A-5C, the UE 620 of FIG. 6, a mobile device, and/or other UE or device). In another example, the process 1500 may be performed by a computing device with the computing system 1600 shown in FIG. 16. For instance, a wireless communication device (e.g., the wireless device 407 of FIG. 4, the UE 505 of FIGS. 5A-5C, the UE 620 of FIG. 6, a mobile device, and/or other UE or device) with the computing architecture shown in FIG. 16 may include the components of the UE and may implement the operations of FIG. 15.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1500 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
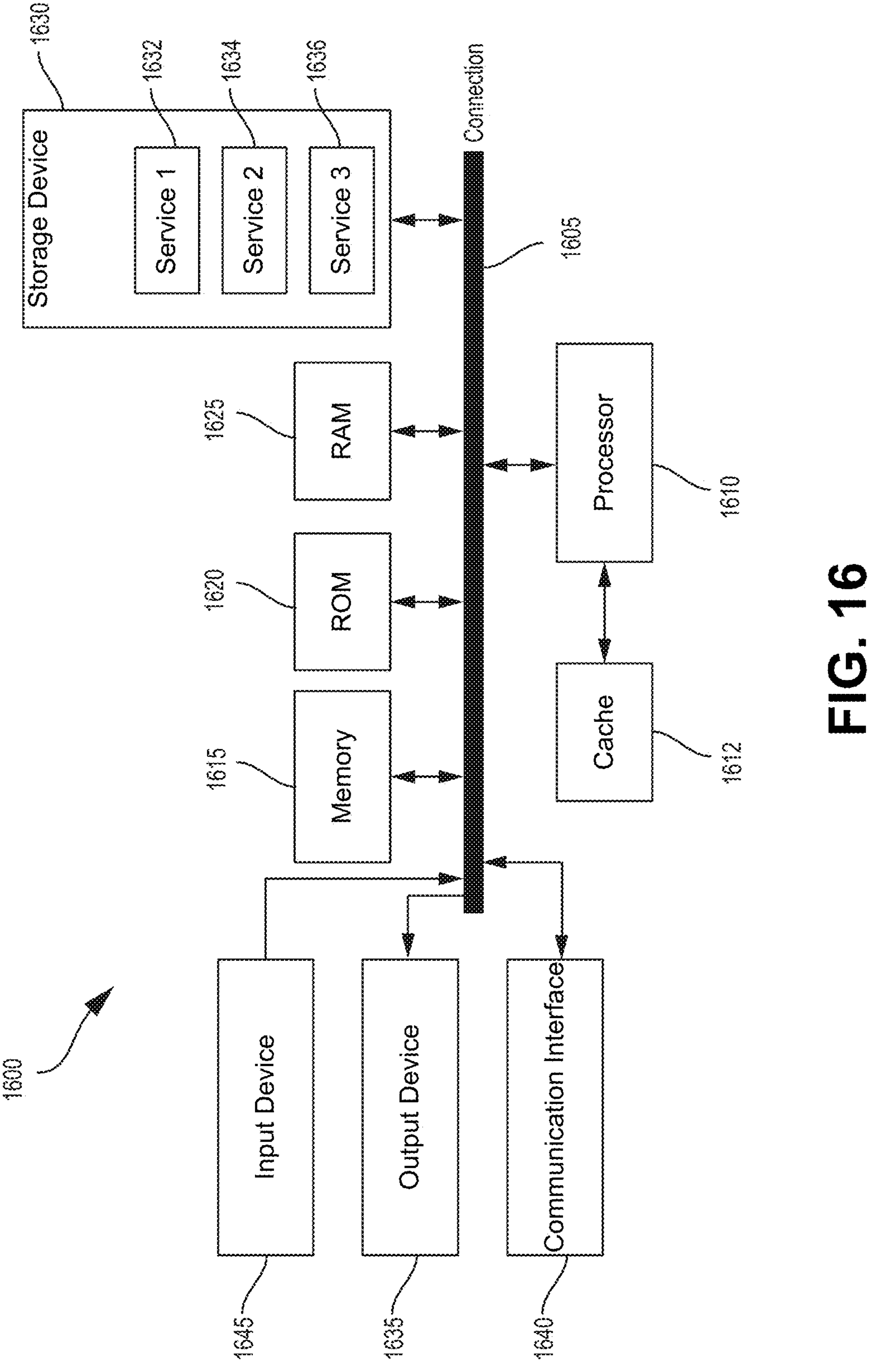
FIG. 16 is a block diagram illustrating an example of a computing system, in accordance with some examples.

FIG. 16 is a diagram illustrating an example of a system for implementing certain aspects of the present technology. In particular, FIG. 16 illustrates an example of computing system 1600, which may be for example any computing device making up internal computing system, a remote computing system, a camera, or any component thereof in which the components of the system are in communication with each other using connection 1605. Connection 1605 may be a physical connection using a bus, or a direct connection into processor 1610, such as in a chipset architecture. Connection 1605 may also be a virtual connection, networked connection, or logical connection.

In some aspects, computing system 1600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1600 includes at least one processing unit (CPU or processor) 1610 and connection 1605 that communicatively couples various system components including system memory 1615, such as read-only memory (ROM) 1620 and random access memory (RAM) 1625 to processor 1610. Computing system 1600 may include a cache 1612 of high-speed memory connected directly with, in close proximity to, or integrated as part of processor 1610.

Processor 1610 may include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which may represent any number of input mechanisms, such as a microphone for speech, a touch-sensitive screen for gesture or graphical input, keyboard, mouse, motion input, speech, etc. Computing system 1600 may also include output device 1635, which may be one or more of a number of output mechanisms. In some instances, multimodal systems may enable a user to provide multiple types of input/output to communicate with computing system 1600.

Computing system 1600 may include communications interface 1640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1630 may include software services, servers, services, etc., that when the code that defines such software is executed by the processor 1610, it causes the system to perform a function. In some aspects, a hardware service that performs a particular function may include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure.

A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("<") and greater than or equal to (" ") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method for wireless communications at a user equipment (UE), comprising: receiving a downlink transmission in a first downlink time slot; receiving an update to a scheduling offset associated with a propagation time delay of communications between the UE and a network entity, wherein the update indicates an updated scheduling offset; determining a selected scheduling offset as one of the scheduling offset or the updated scheduling offset; and transmitting, using a second uplink time slot, an uplink transmission associated with the downlink transmission, wherein the second uplink time slot is determined based on a first uplink time slot and the selected scheduling offset.

Aspect 2. The method of Aspect 1, wherein the first uplink time slot overlaps with at least a portion of the first downlink time slot.

Aspect 3. The method of any of Aspects 1 to 2, further comprising: determining a third uplink time slot associated with the updated scheduling offset, wherein the third uplink time slot includes an indication of at least one of an activation time of the updated scheduling offset or a reception time of the updated scheduling offset.

Aspect 4. The method of Aspect 3, further comprising: determining a virtual uplink time slot based on the first uplink time slot, the scheduling offset, and a network timing offset; and selecting the scheduling offset as the selected scheduling offset based on a determination that the third uplink time slot associated with the updated scheduling offset is later than the first uplink time slot and earlier than the virtual uplink time slot.

Aspect 5. The method of Aspect 4, wherein the second uplink time slot and the virtual uplink time slot are the same.

Aspect 6. The method of any of Aspects 3 to 5, further comprising: determining a virtual uplink time slot based on the first uplink time slot, the scheduling offset, and a network timing offset; and selecting the updated scheduling offset as the selected scheduling offset based on a determination that the third uplink time slot associated with the updated scheduling offset is later than the first uplink time slot and earlier than the virtual uplink time slot.

Aspect 7. The method of Aspect 6, wherein the second uplink time slot is a sum of the first uplink time slot, the updated scheduling offset, and the network timing offset.

Aspect 8. The method of any of Aspects 3 to 7, wherein determining the selected scheduling offset includes: selecting the scheduling offset as the selected scheduling offset based on a determination that the first uplink time slot is earlier than the third uplink time slot associated with the updated scheduling offset.

Aspect 9. The method of any of Aspects 3 to 8, wherein determining the selected scheduling offset includes: selecting the updated scheduling offset as the selected scheduling offset based on a determination that the first uplink time slot is later than the third uplink time slot associated with the updated scheduling offset.

Aspect 10. The method of any of Aspects 3 to 9, wherein determining the selected scheduling offset includes: determining a virtual uplink time slot based on the first uplink time slot, the scheduling offset, and a network timing offset; and selecting the updated scheduling offset as the selected scheduling offset based on a determination that the virtual uplink time slot is later than the third uplink time slot associated with the updated scheduling offset.

Aspect 11. The method of any of Aspects 3 to 10, wherein determining the selected scheduling offset includes: determining a virtual uplink time slot based on the first uplink time slot, the scheduling offset, and a network timing offset; and selecting the scheduling offset as the selected scheduling offset based on a determination that the virtual uplink time slot is not later than the third uplink time slot associated with the updated scheduling offset.

Aspect 12. The method of any of Aspects 3 to 11, wherein determining the selected scheduling offset includes: selecting the scheduling offset as the selected scheduling offset based on a determination that an uplink time slot determined as a sum of the first uplink time slot and a network timing offset is earlier than the third uplink time slot associated with the updated scheduling offset.

Aspect 13. The method of any of Aspects 3 to 12, wherein determining the selected scheduling offset includes: selecting the updated scheduling offset as the selected scheduling offset based on a determination that an uplink time slot determined as a sum of the first uplink time slot and a network timing offset is later than the third uplink time slot associated with the updated scheduling offset.

Aspect 14. The method of any of Aspects 1 to 13, further comprising: selecting the scheduling offset or the updated scheduling offset as the selected scheduling offset based on whether the scheduling offset or the updated scheduling offset is currently active at an uplink time slot determined as a sum of the first uplink time slot and a network timing offset.

Aspect 15. The method of Aspect 14, wherein the second uplink time slot is a sum of the first uplink time slot, the scheduling offset or the updated scheduling offset, and the network timing offset.

Aspect 16. The method of any of Aspects 1 to 15, wherein determining the selected scheduling offset includes: selecting the scheduling offset or the updated scheduling offset as the selected scheduling offset based on whether the scheduling offset or the updated scheduling offset is currently active when the downlink transmission is received.

Aspect 17. The method of any of Aspects 1 to 16, wherein determining the selected scheduling offset includes: determining a virtual uplink time slot based on the first uplink time slot, the scheduling offset, and a network timing offset; and selecting the scheduling offset or the updated scheduling offset as the selected scheduling offset based on whether the scheduling offset or the updated scheduling offset is currently active at the virtual uplink time slot.

Aspect 18. The method of any of Aspects 1 to 17, wherein: the selected scheduling offset is a cell-specific scheduling offset; and the second uplink time slot is a sum of the first uplink time slot, the cell-specific scheduling offset, and a network timing offset.

Aspect 19. The method of any of Aspects 1 to 18, wherein the uplink transmission includes feedback associated with the downlink transmission.

Aspect 20. The method of Aspect 19, wherein the feedback is Hybrid Automatic Repeat Request (HARQ) feedback including an acknowledgement or a negative acknowledgement.

Aspect 21. The method of Aspect 20, wherein the HARQ feedback is included in a HARQ codebook, the HARQ codebook including two or more instances of HARQ feedback.

Aspect 22. The method of any of Aspects 1 to 21, wherein the uplink transmission includes a Channel State Information (CSI) report.

Aspect 23. The method of Aspect 22, wherein the downlink transmission includes a CSI request.

Aspect 24. The method of any of Aspects 1 to 23, wherein the uplink transmission includes an aperiodic Sounding Reference Signal (SRS).

Aspect 25. The method of Aspect 24, wherein the downlink transmission includes an aperiodic SRS command.

Aspect 26. The method of any of Aspects 1 to 25, wherein the uplink transmission is transmitted using Physical Uplink Shared Channel (PUSCH).

Aspect 27. The method of Aspect 26, wherein the PUSCH is scheduled by the downlink transmission, and wherein the downlink transmission is scheduled by a Physical Downlink Control Channel (PDCCH).

Aspect 28. An apparatus for wireless communications, comprising: at least one memory; and at least one processor coupled to at least one memory and configured to: receive a downlink transmission in a first downlink time slot; receive an update to a scheduling offset associated with a propagation time delay of communications between the UE and a network entity, wherein the update indicates an updated scheduling offset; determine a selected scheduling offset as one of the scheduling offset or the updated scheduling offset; and transmit, using a second uplink time slot, an uplink transmission associated with the downlink transmission, wherein the second uplink time slot is determined based on a first uplink time slot and the selected scheduling offset.

Aspect 29. The apparatus of Aspect 28, wherein the first uplink time slot overlaps with at least a portion of the first downlink time slot.

Aspect 30. The apparatus of any of Aspects 28 or 29, wherein the at least one processor is configured to: determine a third uplink time slot associated with the updated scheduling offset, wherein the third uplink time slot includes an indication of at least one of an activation time of the updated scheduling offset or a reception time of the updated scheduling offset.

Aspect 31. The apparatus of Aspect 30, wherein the at least one processor is configured to: determine a virtual uplink time slot based on the first uplink time slot, the scheduling offset, and a network timing offset; and select the scheduling offset as the selected scheduling offset based on a determination that the third uplink time slot associated with the updated scheduling offset is later than the first uplink time slot and earlier than the virtual uplink time slot.

Aspect 32. The apparatus of Aspect 31, wherein the second uplink time slot and the virtual uplink time slot are the same.

Aspect 33. The apparatus of any of Aspects 30 to 32, wherein the at least one processor is configured to: determine a virtual uplink time slot based on the first uplink time slot, the scheduling offset, and a network timing offset; and select the updated scheduling offset as the selected scheduling offset based on a determination that the third uplink time slot associated with the updated scheduling offset is later than the first uplink time slot and earlier than the virtual uplink time slot.

Aspect 34. The apparatus of Aspect 33, wherein the second uplink time slot is a sum of the first uplink time slot, the updated scheduling offset, and the network timing offset.

Aspect 35. The apparatus of any of Aspects 30 to 34, wherein the at least one processor is configured to: select the scheduling offset as the selected scheduling offset based on a determination that the first uplink time slot is earlier than the third uplink time slot associated with the updated scheduling offset.

Aspect 36. The apparatus of any of Aspects 30 to 35, wherein the at least one processor is configured to: select the updated scheduling offset as the selected scheduling offset based on a determination that the first uplink time slot is later than the third uplink time slot associated with the updated scheduling offset.

Aspect 37. The apparatus of any of Aspects 30 to 36, wherein the at least one processor is configured to: determine a virtual uplink time slot based on the first uplink time slot, the scheduling offset, and a network timing offset; and select the updated scheduling offset as the selected scheduling offset based on a determination that the virtual uplink time slot is later than the third uplink time slot associated with the updated scheduling offset.

Aspect 38. The apparatus of any of Aspects 30 to 37, wherein the at least one processor is configured to: determine a virtual uplink time slot based on the first uplink time slot, the scheduling offset, and a network timing offset; and select the scheduling offset as the selected scheduling offset based on a determination that the virtual uplink time slot is not later than the third uplink time slot associated with the updated scheduling offset.

Aspect 39. The apparatus of any of Aspects 30 to 38, wherein the at least one processor is configured to: select the scheduling offset as the selected scheduling offset based on a determination that an uplink time slot determined as a sum of the first uplink time slot and a network timing offset is earlier than the third uplink time slot associated with the updated scheduling offset.

Aspect 40. The apparatus of any of Aspects 30 to 39, wherein the at least one processor is configured to: select the updated scheduling offset as the selected scheduling offset based on a determination that an uplink time slot determined as a sum of the first uplink time slot and a network timing offset is later than the third uplink time slot associated with the updated scheduling offset.

Aspect 41. The apparatus of any of Aspects 28 to 40, wherein the at least one processor is configured to: select the scheduling offset or the updated scheduling offset as the selected scheduling offset based on whether the scheduling offset or the updated scheduling offset is currently active at an uplink time slot determined as a sum of the first uplink time slot and a network timing offset.

Aspect 42. The apparatus of Aspect 41, wherein the second uplink time slot is a sum of the first uplink time slot, the scheduling offset or the updated scheduling offset, and the network timing offset.

Aspect 43. The apparatus of any of Aspects 28 to 42, wherein the at least one processor is configured to: select the scheduling offset or the updated scheduling offset as the selected scheduling offset based on whether the scheduling offset or the updated scheduling offset is currently active when the downlink transmission is received.

Aspect 44. The apparatus of any of Aspects 28 to 43, wherein the at least one processor is configured to: determine a virtual uplink time slot based on the first uplink time slot, the scheduling offset, and a network timing offset; and select the scheduling offset or the updated scheduling offset as the selected scheduling offset based on whether the scheduling offset or the updated scheduling offset is currently active at the virtual uplink time slot.

Aspect 45. The apparatus of any of Aspects 28 to 44, wherein: the selected scheduling offset is a cell-specific scheduling offset; and the second uplink time slot is a sum of the first uplink time slot, the cell-specific scheduling offset, and a network timing offset.

Aspect 46. The apparatus of any of Aspects 28 to 45, wherein the uplink transmission includes feedback associated with the downlink transmission.

Aspect 47. The apparatus of Aspect 46, wherein the feedback is Hybrid Automatic Repeat Request (HARQ) feedback including an acknowledgement or a negative acknowledgement.

Aspect 48. The apparatus of Aspect 47, wherein the HARQ feedback is included in a HARQ codebook, the HARQ codebook including two or more instances of HARQ feedback.

Aspect 49. The apparatus of any of Aspects 28 to 48, wherein the uplink transmission includes a Channel State Information (CSI) report.

Aspect 50. The apparatus of Aspect 49, wherein the downlink transmission includes a CSI request.

Aspect 51. The apparatus of any of Aspects 28 to 50, wherein the uplink transmission includes an aperiodic Sounding Reference Signal (SRS).

Aspect 52. The apparatus of Aspect 51, wherein the downlink transmission includes an aperiodic SRS command.

Aspect 53. The apparatus of any of Aspects 28 to 52, wherein the uplink transmission is transmitted using Physical Uplink Shared Channel (PUSCH).

Aspect 54. The apparatus of Aspect 53, wherein the PUSCH is scheduled by the downlink transmission, and wherein the downlink transmission is scheduled by a Physical Downlink Control Channel (PDCCH).

Aspect 55. The apparatus of any of Aspects 28 to 54, wherein the apparatus is configured as a user equipment (UE), and further comprising: a transceiver configured to receive the downlink transmission, receive the update, and transmit the uplink transmission.

Aspect 56. A non-transitory computer-readable medium including instructions which, when executed by one or more processors, cause the one or more processors to perform operations according to any of Aspects 1 to 55.

Aspect 57. An apparatus comprising one or more means for performing operations according to any of Aspects 1 to 55.

Aspect 58. A method for wireless communications at a network entity, comprising: transmitting a downlink transmission to a user equipment (UE) in a first time slot; transmitting an update to a scheduling offset associated with a propagation time delay of communications between the network entity and the UE, wherein the update indicates an updated scheduling offset; and receiving, based on the update and the downlink transmission, an uplink transmission in a second time slot.

Aspect 59. The method of Aspect 58, wherein the uplink transmission includes feedback associated with the downlink transmission.

Aspect 60. The method of Aspect 59, wherein the feedback is Hybrid Automatic Repeat Request (HARQ) feedback including an acknowledgement or a negative acknowledgement.

Aspect 61. The method of Aspect 60, wherein the HARQ feedback is included in a HARQ codebook, the HARQ codebook including two or more instances of HARQ feedback.

Aspect 62. The method of Aspect 58, wherein the uplink transmission includes a Channel State Information (CSI) report.

Aspect 63. The method of Aspect 62, wherein the downlink transmission includes a CSI request.

Aspect 64. The method of Aspect 58, wherein the uplink transmission includes an aperiodic Sounding Reference Signal (SRS).

Aspect 65. The method of Aspect 64, wherein the downlink transmission includes an aperiodic SRS command.

Aspect 66. The method of any one of Aspects 58 to 65, wherein the uplink transmission is received using a Physical Uplink Shared Channel (PUSCH).

Aspect 67. The method of Aspect 66, wherein the PUSCH is scheduled by the downlink transmission, and wherein the downlink transmission is scheduled by a Physical Downlink Control Channel (PDCCH).

Aspect 68. The method of Aspect 58, wherein the network entity is a base station.

Aspect 69. The method of Aspect 68, wherein the base station is one of a next generation node B (gNB) or an evolved node B (eNB).

Aspect 70. The method of Aspect 58, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 71. The method of Aspect 58, wherein the network entity is a Non-Terrestrial Network (NTN) entity.

Aspect 72. The method of Aspect 71, wherein the NTN entity is a satellite.

Aspect 73. An apparatus for wireless communications, comprising at least one memory and at least one processor coupled to at least one memory and configured to perform operations according to any of Aspects 58 to 67.

Aspect 74. The apparatus of Aspect 73, wherein the apparatus is configured as a network entity, and further comprising: a transceiver configured to transmit the downlink transmission, transmit the update, and receive the uplink transmission.

Aspect 75. The apparatus of Aspect 74, wherein the network entity is a base station.

Aspect 76. The apparatus of Aspect 75, wherein the base station is one of a next generation node B (gNB) or an evolved node B (eNB).

Aspect 77. The apparatus of Aspect 74, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 78. The apparatus of Aspect 74, wherein the network entity is a Non-Terrestrial Network (NTN) entity.

Aspect 79. The apparatus of Aspect 78, wherein the NTN entity is a satellite.

Aspect 80. A non-transitory computer-readable medium including instructions which, when executed by one or more processors, cause the one or more processors to perform operations according to any of Aspects 58 to 79.

Aspect 81. An apparatus comprising one or more means for performing operations according to any of Aspects 58 to 79.

Aspect 82. The method of Aspect 1, wherein the network entity is a base station.

Aspect 83. The method of Aspect 82, wherein the base station is one of a next generation node B (gNB) or an evolved node B (eNB).

Aspect 84. The method of Aspect 1, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 85. The method of Aspect 1, wherein the network entity is a Non-Terrestrial Network (NTN) entity.

Aspect 86. The method of Aspect 85, wherein the NTN entity is a satellite.

Aspect 87. The apparatus of Aspect 28, wherein the network entity is a base station.

Aspect 88. The apparatus of Aspect 87, wherein the base station is one of a next generation node B (gNB) or an evolved node B (eNB).

Aspect 89. The apparatus of Aspect 28, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 90. The apparatus of Aspect 28, wherein the network entity is a Non-Terrestrial Network (NTN) entity.

Aspect 91. The apparatus of Aspect 90, wherein the NTN entity is a satellite.

Aspect 92. The method of any of Aspects 16 to 27, wherein the downlink transmission is a Physical Downlink Control Channel (PDCCH) transmission including Downlink Control Information (DCI).

Aspect 93. The apparatus of any of Aspects 44 to 57, wherein the downlink transmission is a Physical Downlink Control Channel (PDCCH) transmission including Downlink Control Information (DCI).

What is claimed is:

1. An apparatus for wireless communications, comprising:

at least one memory; and at least one processor coupled to at least one memory and configured to:

receive a downlink transmission in a first downlink time slot, wherein a first scheduling offset is applicable at a downlink time slot corresponding to the downlink transmission, and wherein the downlink transmission is a Physical Downlink Control Channel (PDCCH) transmission including Downlink Control Information (DCI) that schedules an uplink transmission;

receive a second scheduling offset, wherein the first scheduling offset and the second scheduling offset are associated with a propagation time delay of communications between the apparatus and a network entity, and wherein the second scheduling offset is received as an update to the first scheduling offset after the uplink transmission is scheduled by the DCI;

select, from the first scheduling offset or the second scheduling offset, the first scheduling offset based on a determination that the first scheduling offset is currently active when the downlink transmission is received; and transmit, in a second uplink time slot, the uplink transmission associated with the downlink transmission, wherein the second uplink time slot is determined based on a first uplink time slot and the selected first scheduling offset, and wherein the first uplink time slot overlaps with at least a portion of the first downlink time slot.

2. The apparatus of claim 1, wherein the uplink transmission is a Physical Uplink Control Channel (PUCCH) transmission or a Physical Uplink Shared Channel (PUSCH) transmission scheduled by the DCI.

3. The apparatus of claim 1, wherein the downlink time slot corresponding to the downlink transmission is the first downlink time slot.

4. The apparatus of claim 1, wherein the downlink time slot corresponding to the downlink transmission overlaps with a last symbol of the downlink transmission.

5. The apparatus of claim 1, wherein the first scheduling offset is different than the second scheduling offset.

6. The apparatus of claim 1, wherein the uplink transmission includes feedback associated with the downlink transmission.

7. The apparatus of claim 6, wherein the feedback is Hybrid Automatic Repeat Request (HARQ) feedback including an acknowledgement or a negative acknowledgement.

8. The apparatus of claim 7, wherein the HARQ feedback is included in a HARQ codebook, the HARQ codebook including two or more instances of HARQ feedback.

9. The apparatus of claim 1, wherein the uplink transmission includes a Channel State Information (CSI) report.

10. The apparatus of claim 1, wherein the uplink transmission includes an aperiodic Sounding Reference Signal (SRS).

11. The apparatus of claim 10, wherein the downlink transmission includes an aperiodic SRS command.

12. The apparatus of claim 1, wherein the at least one processor is configured to transmit the uplink transmission using Physical Uplink Shared Channel (PUSCH).

13. The apparatus of claim 12, wherein the PUSCH is scheduled by the downlink transmission.

14. The apparatus of claim 1, wherein the at least one processor is configured to transmit the uplink transmission using Physical Uplink Control Channel (PUCCH).

15. The apparatus of claim 1, wherein the network entity comprises a non-terrestrial network (NTN) gateway or an NTN base station.

16. A method for wireless communications at a user equipment (UE), comprising:

receiving a downlink transmission in a first downlink time slot, wherein a first scheduling offset is applicable at a downlink time slot corresponding to the downlink transmission, and wherein the downlink transmission is a Physical Downlink Control Channel (PDCCH) transmission including Downlink Control Information (DCI) that schedules an uplink transmission;

receiving a second scheduling offset, wherein the first scheduling offset and the second scheduling offset are associated with a propagation time delay of communications between the UE and a network entity, and wherein the second scheduling offset is received as an update to the first scheduling offset after the uplink transmission is scheduled by the DCI;

selecting, from the first scheduling offset or the second scheduling offset, the first scheduling offset based on a determination that the first scheduling offset is currently active when the downlink transmission is received; and transmitting, in a second uplink time slot, the uplink transmission associated with the downlink transmission, wherein the second uplink time slot is determined based on a first uplink time slot and the selected first scheduling offset, and wherein the first uplink time slot overlaps with at least a portion of the first downlink time slot.

17. The method of claim 16, wherein the downlink time slot corresponding to the downlink transmission is the first downlink time slot.

18. The method of claim 16, wherein the downlink time slot corresponding to the downlink transmission overlaps with a last symbol of the downlink transmission.

19. The method of claim 16, wherein the first scheduling offset is different than the second scheduling offset.

20. The method of claim 16, wherein the uplink transmission includes one or more of a Channel State Information (CSI) report, an aperiodic Sounding Reference Signal (SRS), or feedback associated with the downlink transmission.

21. The method of claim 20, wherein the feedback is Hybrid Automatic Repeat Request (HARQ) feedback including an acknowledgement or a negative acknowledgement.

22. The method of claim 16, wherein the uplink transmission is transmitted using Physical Uplink Shared Channel (PUSCH).

23. The method of claim 22, wherein the PUSCH is scheduled by the downlink transmission.

24. The method of claim 16, wherein the uplink transmission is transmitted using Physical Uplink Control Channel (PUCCH).

25. The method of claim 16, wherein the uplink transmission is a Physical Uplink Control Channel (PUCCH) transmission or a Physical Uplink Shared Channel (PUSCH) transmission scheduled by the DCI.

26. An apparatus for wireless communications, comprising:

at least one memory; and at least one processor coupled to at least one memory and configured to:

transmit a downlink transmission to a user equipment (UE) in a first downlink time slot, wherein a first scheduling offset is applicable at a downlink time slot corresponding to the downlink transmission, and wherein the downlink transmission is a Physical Downlink Control Channel (PDCCH) transmission including Downlink Control Information (DCI) that schedules an uplink transmission;

transmit a second scheduling offset, wherein the first scheduling offset and the second scheduling offset are associated with a propagation time delay of communications between the apparatus and the UE, and wherein the second scheduling offset is transmitted as an update to the first scheduling offset after the uplink transmission is scheduled by the DCI; and receive, in a second uplink time slot based on a first uplink time slot and a selection by the UE of the first scheduling offset from the first scheduling offset or the second scheduling offset, the uplink transmission associated with the downlink transmission, wherein the selection of the first scheduling offset is based on a determination that the first scheduling offset is currently active.

27. A method for wireless communications at a network entity, comprising:

transmitting a downlink transmission to a user equipment (UE) in a first downlink time slot, wherein a first scheduling offset is applicable at a downlink time slot corresponding to the downlink transmission, and wherein the downlink transmission is a Physical Downlink Control Channel (PDCCH) transmission including Downlink Control Information (DCI) that schedules an uplink transmission;

transmitting a second scheduling offset, wherein the first scheduling offset and the second scheduling offset are associated with a propagation time delay of communications between the network entity and the UE, and wherein the second scheduling offset is transmitted as an update to the first scheduling offset after the uplink transmission is scheduled by the DCI; and receiving, in a second uplink time slot based on a first uplink time slot and a selection by the UE of the first scheduling offset from the first scheduling offset or the second scheduling offset, the uplink transmission associated with the downlink transmission, wherein the selection of the first scheduling offset is based on a determination that the first scheduling offset is currently active.

* * * * *